(12) United States Patent
Spencer

(10) Patent No.: US 6,356,909 B1
(45) Date of Patent: Mar. 12, 2002

(54) WEB BASED SYSTEM FOR MANAGING REQUEST FOR PROPOSAL AND RESPONSES

(75) Inventor: Jeffrey S. Spencer, Los Angeles, CA (US)

(73) Assignee: Proposal Technologies Network, Inc., Los Angeles, CA (US)

( * ) Notice: Subject to any disclaimer, the term of this patent is extended or adjusted under 35 U.S.C. 154(b) by 0 days.

(21) Appl. No.: 09/379,172

(22) Filed: Aug. 23, 1999

(51) Int. Cl.⁷ .............................................. G06F 17/30
(52) U.S. Cl. ........................................ 707/10; 707/100
(58) Field of Search ............................. 707/10, 6, 104, 707/100, 3, 4; 705/1, 26, 37

(56) References Cited

U.S. PATENT DOCUMENTS

| | | | |
|---|---|---|---|
| 5,615,342 A | 3/1997 | Johnson ....................... | 705/27 |
| 5,758,328 A | 5/1998 | Giovannoli ................... | 705/26 |
| 5,765,138 A | 6/1998 | Aycock et al. ................. | 705/7 |
| 5,802,493 A * | 9/1998 | Sheflott et al. ................ | 705/1 |
| 5,842,178 A | 11/1998 | Giovannoli ................... | 705/26 |
| 5,870,719 A | 2/1999 | Maritzen et al. .............. | 705/26 |
| 5,878,423 A * | 3/1999 | Anderson et al. ........... | 707/100 |
| 6,014,644 A * | 1/2000 | Erickson ...................... | 705/37 |
| 6,085,169 A * | 7/2000 | Walker et al. ................. | 705/26 |
| 6,088,700 A * | 7/2000 | Larsen et al. ................. | 707/10 |

OTHER PUBLICATIONS

International Preliminary Examination Report, Dated Jun. 13, 2001.

\* cited by examiner

*Primary Examiner*—Sanjiv Shah
(74) *Attorney, Agent, or Firm*—Christie, Parker & Hale, LLP

(57) ABSTRACT

An integrated web based system for generating electronic request for proposal (RFP) forms and responding to the generated RFPs over a secure communications network. Using a web site interface, the present invention enables users to request specific information for goods and services from specific vendors, automates the process of responding to the RFPs, and automates the process of reviewing, analyzing and presenting the results. Potential vendors are notified via e-mail when the RFP is completed, and have the option to respond to the RFP by using information stored in the associated online databases or by providing new information that is then stored in the online databases. The system remembers links from questions to all appropriate responses and prompts vendors to add them to their response form. Analysis on completed forms is automated and enables the users to evaluate RFPs.

27 Claims, 28 Drawing Sheets

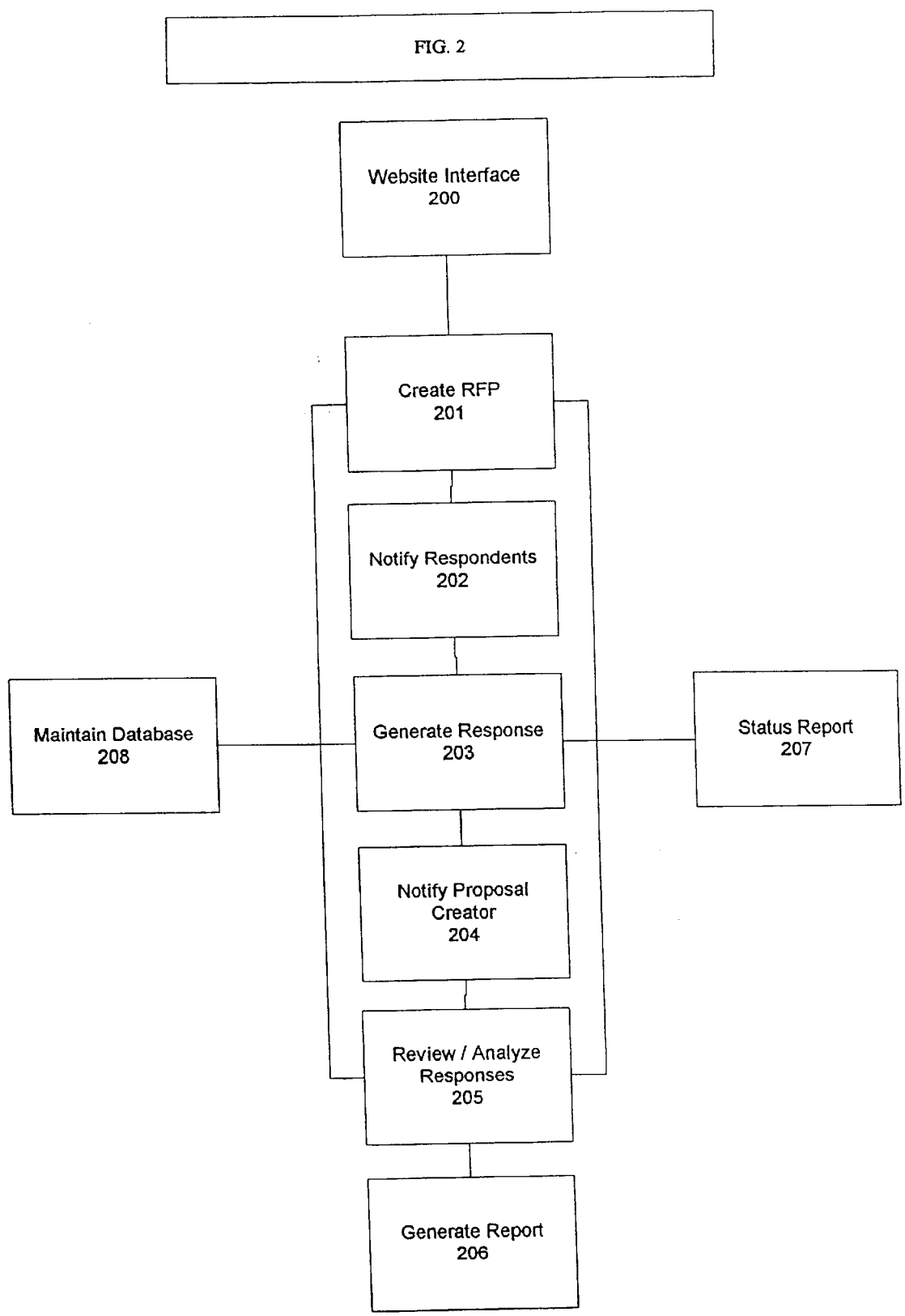

Relational Database
Question to Responses to Analysis Summaries
FIG. 3C

Question Database 2

| Question ID | Question | Question Details |
|---|---|---|
| Q001 | Question Text 1 | User, Date, Other Details |
| Q002 | Question Text 2 | User, Date, Other Details |
| Q003 | Question Text 3 | User, Date, Other Details |
| Q004 | Question Text 4 | User, Date, Other Details |
| Q005 | Question Text 5 | User, Date, Other Details |
| Q006 | Question Text 6 | User, Date, Other Details |
| QNNN | Question Text N | User, Date, Other Details |

A

Response Database 4

| Response ID | Response | Question ID | Response Details |
|---|---|---|---|
| R001 | Response Text 1 | Q001 | User, Date, Other Details |
| R002 | Response Text 2 | Q002 | User, Date, Other Details |
| R003 | Response Text 3 | Q002 | User, Date, Other Details |
| R004 | Response Text 4 | Q002 | User, Date, Other Details |
| R005 | Response Text 5 | Q002 | User, Date, Other Details |
| R006 | Response Text 6 | Q003 | User, Date, Other Details |
| R007 | Response Text 7 | Q003 | User, Date, Other Details |
| R008 | Response Text 8 | Q004 | User, Date, Other Details |
| R009 | Response Text 9 | Q005 | User, Date, Other Details |
| R010 | Response Text 10 | Q006 | User, Date, Other Details |
| R011 | Response Text 11 | Q006 | User, Date, Other Details |

B

Analysis Summary Database 3

| Analysis ID | Analysis | Response ID | Analysis Details |
|---|---|---|---|
| A001 | Analysis Text 1 | R001 | User, Date, Other Details |
| A002 | Analysis Text 2 | R002 | User, Date, Other Details |
| A003 | Analysis Text 3 | R002 | User, Date, Other Details |
| A004 | Analysis Text 4 | R002 | User, Date, Other Details |
| A005 | Analysis Text 5 | R003 | User, Date, Other Details |
| A006 | Analysis Text 6 | R003 | User, Date, Other Details |
| A007 | Analysis Text 7 | R004 | User, Date, Other Details |
| A008 | Analysis Text 8 | R005 | User, Date, Other Details |
| A009 | Analysis Text 9 | R006 | User, Date, Other Details |
| A010 | Analysis Text 10 | R006 | User, Date, Other Details |
| A011 | Analysis Text 11 | R006 | User, Date, Other Details |
| A012 | Analysis Text 12 | R007 | User, Date, Other Details |
| A013 | Analysis Text 13 | R008 | User, Date, Other Details |
| A014 | Analysis Text 14 | R009 | User, Date, Other Details |
| A015 | Analysis Text 15 | R010 | User, Date, Other Details |
| A016 | Analysis Text 16 | R010 | User, Date, Other Details |
| A017 | Analysis Text 17 | R010 | User, Date, Other Details |
| A018 | Analysis Text 18 | R011 | User, Date, Other Details |
| A019 | Analysis Text 19 | R011 | User, Date, Other Details |

C

Relational Database
Question to Responses to Analysis Summaries

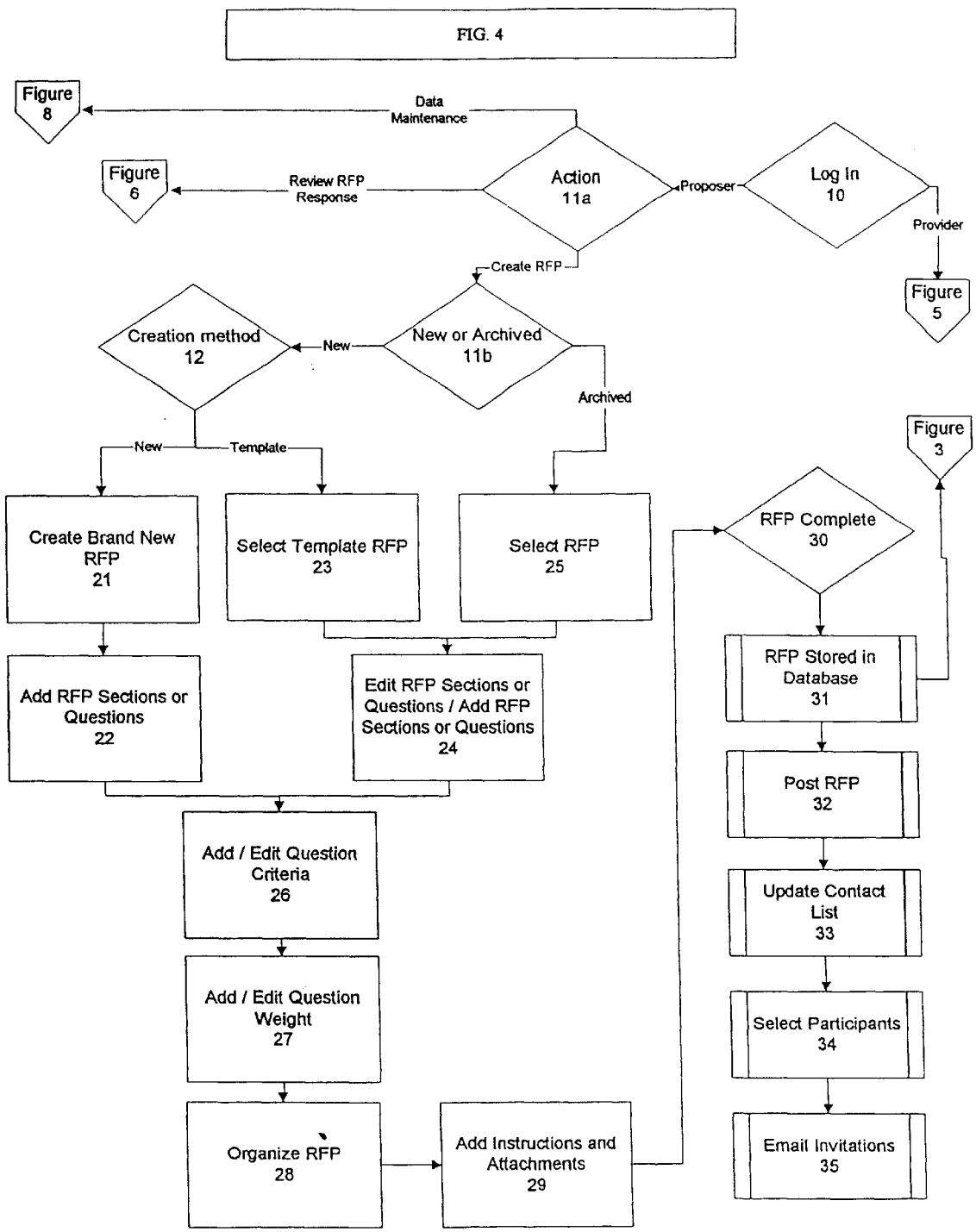

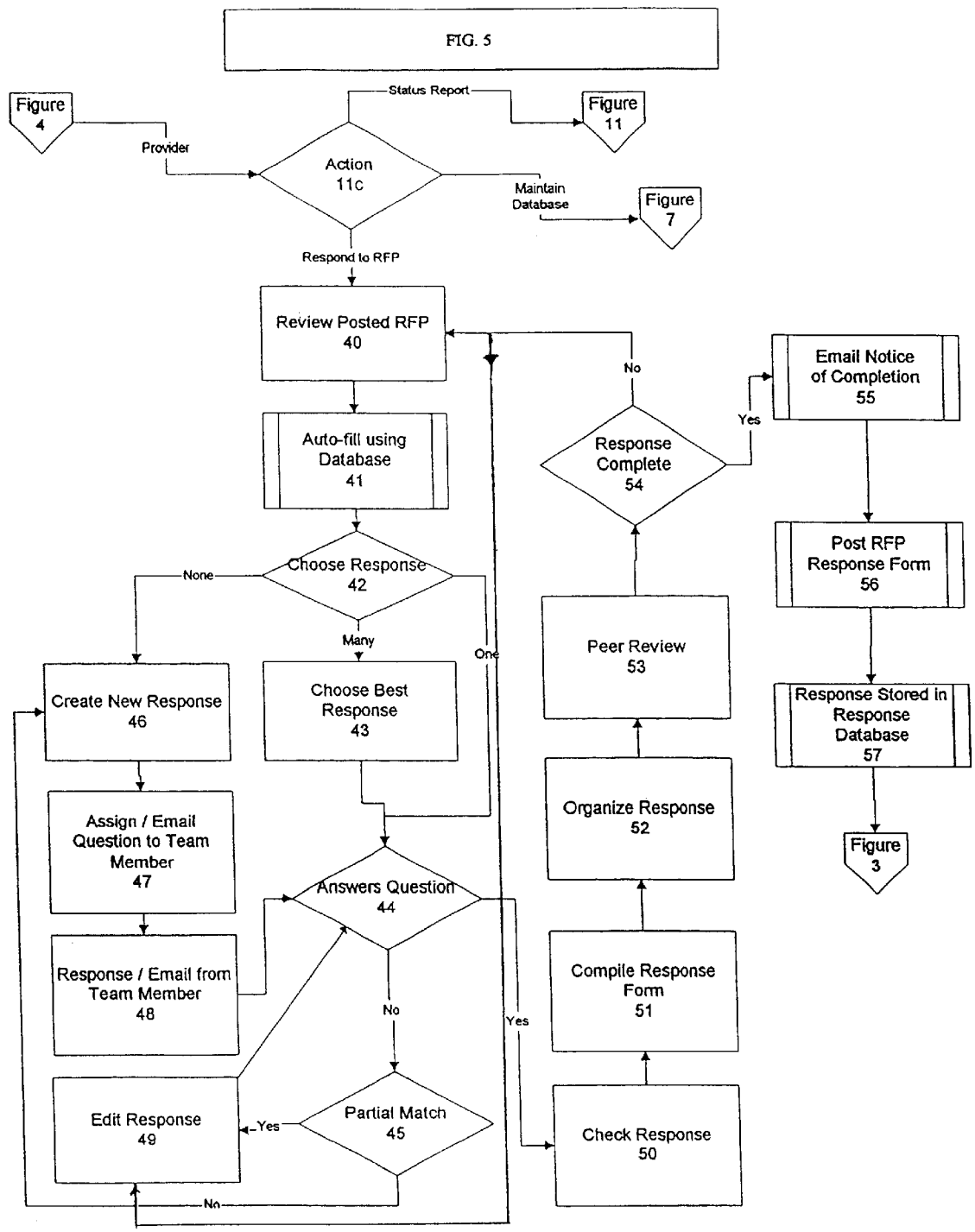

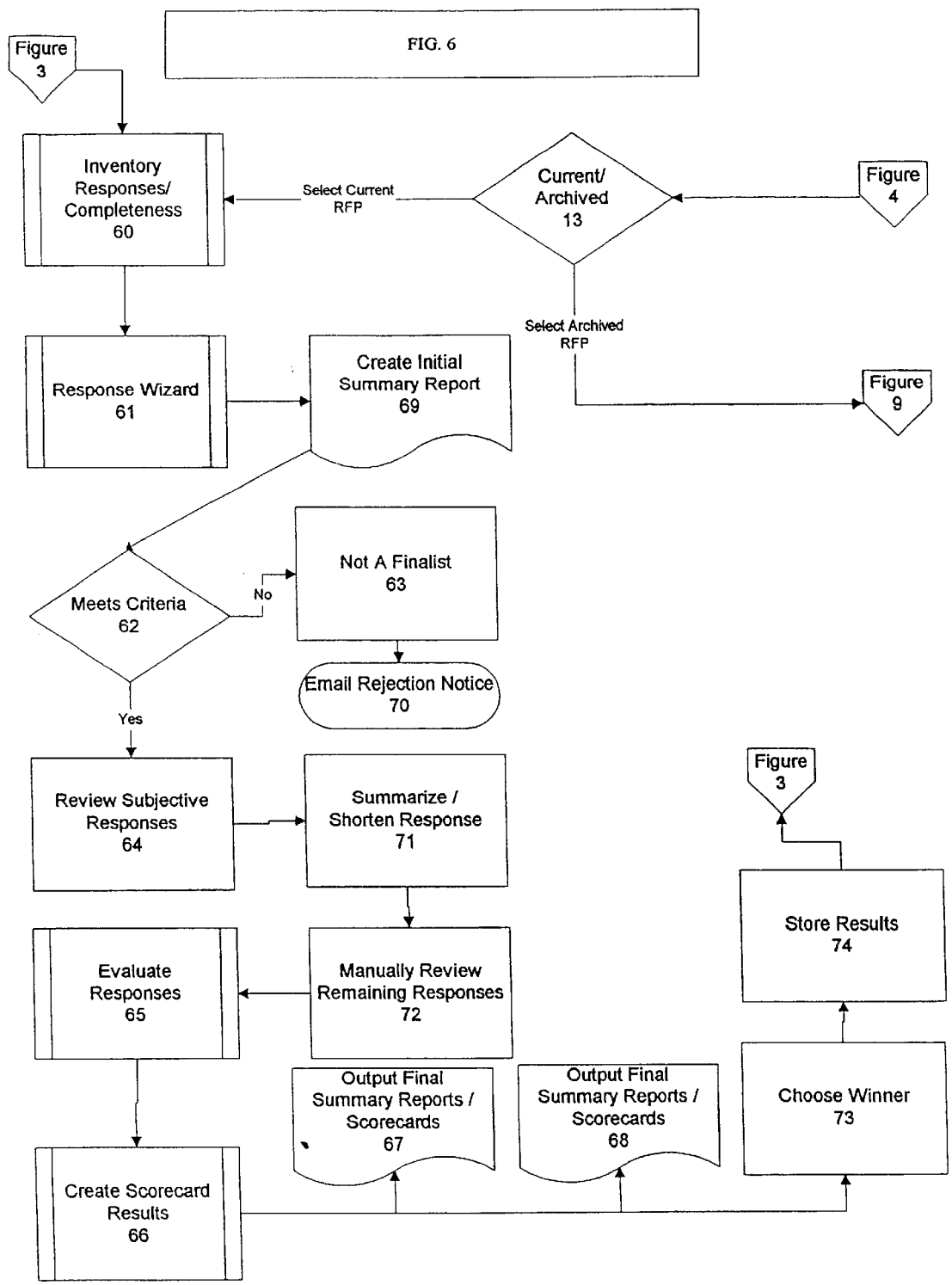

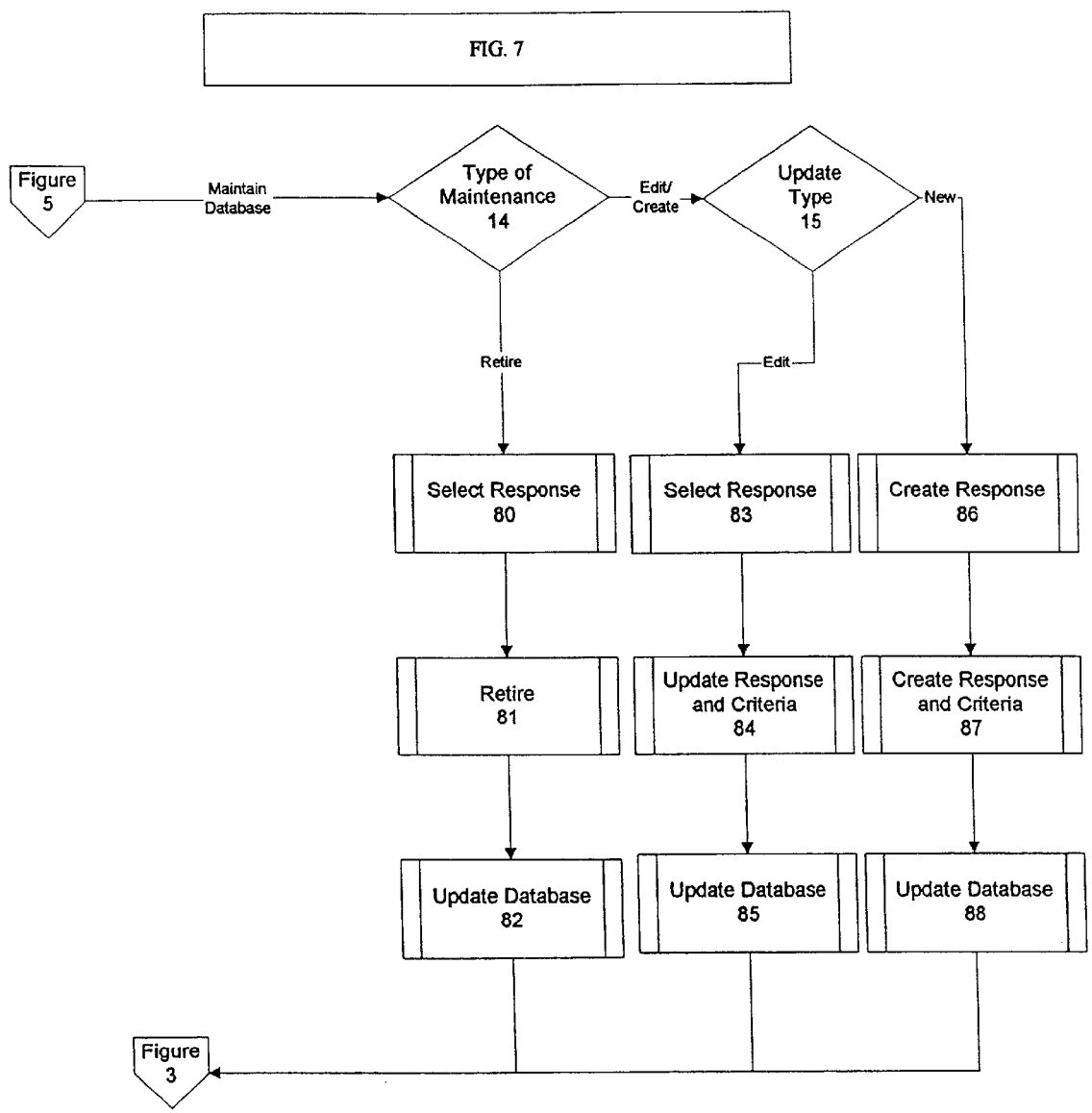

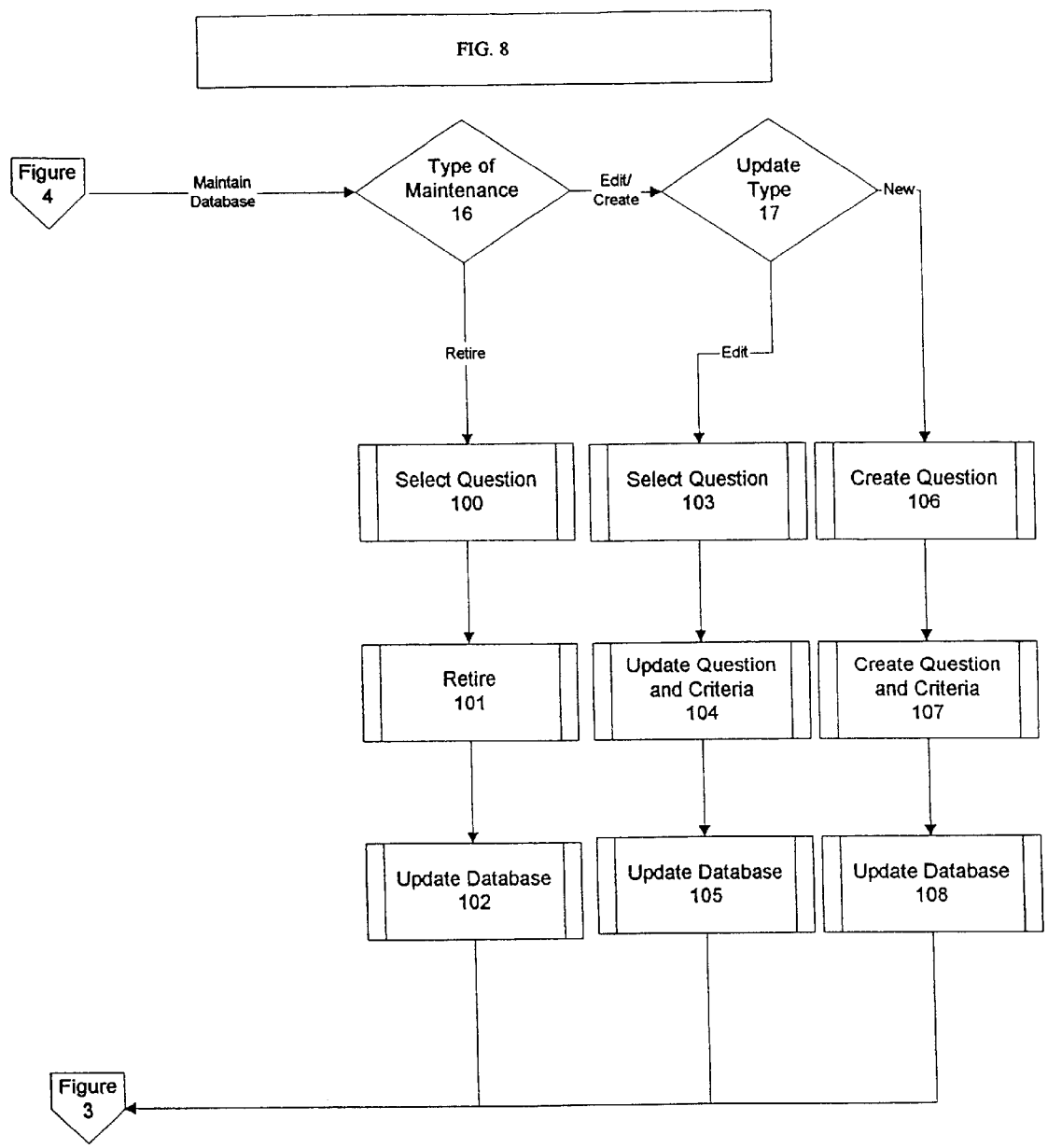

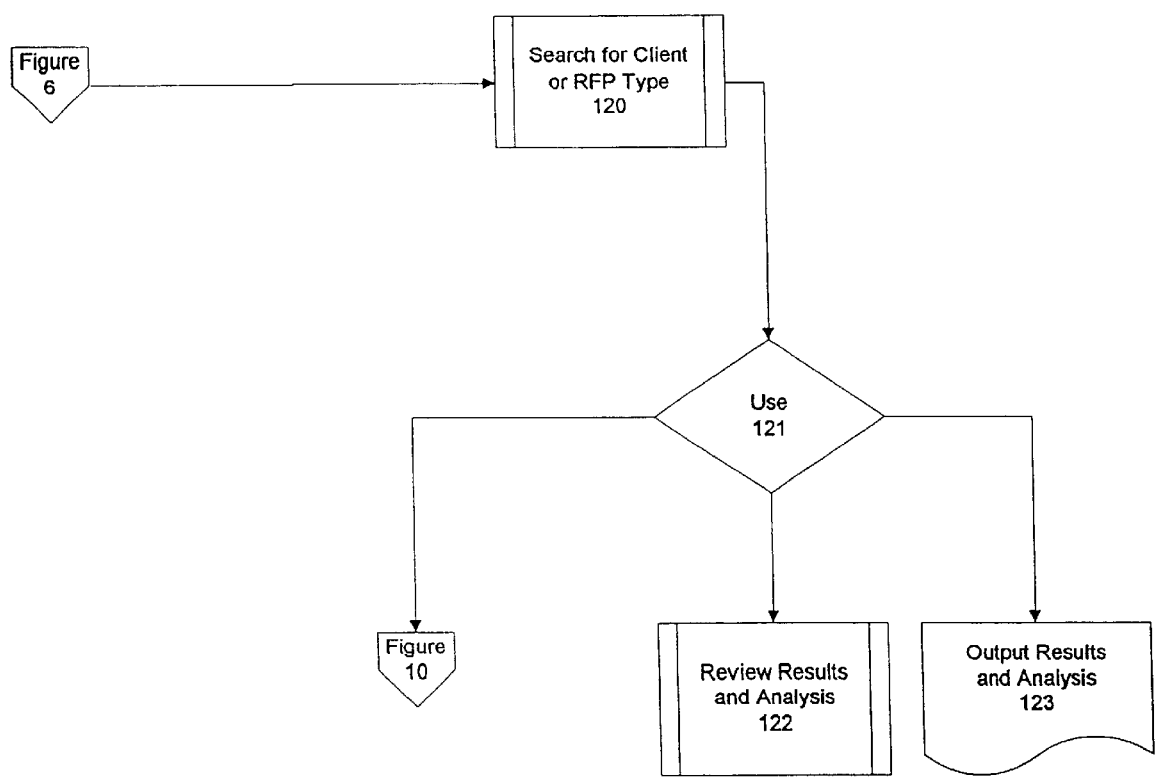

FIG. 12

Welcome Jeff Spencer

When Jeff Spencer comes to this page in the future, he will be able to view a summary report of their RFP's including:

1. a list of RFP's he has created
2. a summary of who has responded to the RFP's Create a New RFP Duplicate an existing RFP View and edit an Existing RFP Send RFP invitations to respond Review Responses Preview Analysis Reports

Log Off

FIG. 13

Home : Create a New RFP

Please provide information for your new RFP below.

| | |
|---:|:---|
| Select RFP Type: | New RFP Type ▼ |
| If "New Type", Specify: | |
| RFP is for what Company: | |
| Instructions: | |
| Disclosures: | |

[Create New RFP]

FIG. 14

Home : View/Edit RFP : Banking Incorporated : Add a Question

Add A Multiple Choice Question to RFP

Question Category: [New Question Category]

If "New Category", Specify: [          ]

Question: [          ]

A. [          ]
B. [          ]
C. [          ]
D. [          ]
E. [          ]
F. [          ]
G. [          ]
H. [          ]

Question Criteria [ ]

[Add Multiple Choice Question]

Home : View/Edit RFP : spencer, inc : Edit Question

Yes/No Question Detail

Question Category: Qualifying Questions

Question: Is your organization capable of providing reporting as required by the client?

Criteria: ○ No Criteria
⊙ Yes
○ No

Edit Question

Delete Question
Warning! This process is irreversible.

Delete Question

Home : Send RFP Invite
Use this area to send an invition to respond to an RFP that you have created.
NOTE: Do not send RFP invites unless the RFP is complete. You will not be able to edit the RFP after sending out an invitation to respond.

| | |
|---|---|
| RFP | [Medical - Banking Incorporated ▼] |
| Message/Instructions | [                    ] |
| Send To | ☑ Blue Cross (paul@bwe.net) |
| | ☑ Health Net (jeff@proposaltech.com) |
| | ☑ Blue Shield (paul@bwe.net) |
| | [ Next > ] |

Home : Address Book

Use the following area to add contacts to your online address book. This information will be used to send invitations to respond to an RFP.

You currently have 6 contacts in your address book.

To add a contact go here.

To edit a contact, select from the list of contacts below.

Jeffrey Spencer
Steve Spencer
Michelle Spencer
Carlie Marraro
Laura Spencer
Frank Easterbrook

FIG. 17

Home : Address Book : Edit Contact

First/Last Name: Jeffrey
Spencer

Company: ProposalTech

E-mail: jspencer@proposaltech.com

User Name and Password
User name and password must consist of 4-8 alphanumeric characters User Name jspencer Password: *******

Confirm Password: *******

[ Edit Contact ]

Delete Contact
Warning! This process is irreversible.

[ Delete Contact ]

Home : Create a New RFP

Existing rfp type with an ID of 3 was selected.

New rfp has been assigned an ID of 21

You can now start adding questions to this RFP: Yes/No | Text | Multiple Choice

FIG. 20

Welcome Jeff Spencer

You have been invited to respond to the following RFP's:

| Company | RFP Type | Complete? | Posted? |
|---|---|---|---|
| BWE, Inc. | Dental | Yes | Yes |
| BWE, Inc. 2 | Dental | Yes | Yes |
| Widgets Incorporated | Medical | Yes | Yes |
| ACME Corp. | Medical | Yes | Yes |
| Ajax Companies | Medical | Yes | Yes |
| eWorld.com | Medical | Yes | Yes |
| Spencer & Associates | Medical | Yes | Yes |
| Wigets R Us | Medical | Yes | No |
| New World Diodes | Medical | No | No |
| 401k Planners | Defined Contributions | No | No |
| SupplyCo Inc. | Medical | Yes | Yes |
| Avix Company | Medical | Yes | Yes |
| Cola Bottlers | Medical | No | No |
| Big Bank, LLP | Medical | No | No |

Log Off
Administer User Access

Home : View RFP : Widgets Incorporated

RFP Status: Posted

I. Qualifying Questions
1. Are you cabable of administering the plan that has been specified in the RFP?

2. Are you NCQA accredited?

II. Administration
1. Please describe your administrative services?

2. Is there an additional cost for administrative services

3. If there is a cost for administrative services, please summarize them here.

4. What is your retention for overhead and profit?

III. Performance Guarantees
1. Please describe your performance guarantees.

FIG. 21A

Home : View RFP : Widgets Incorporated

RFP Status: Posted

I. Qualifying Questions

1. Are you cabable of administering the plan that has been specified in the RFP?
   Yes. We are fully capable of administering all of the provisions.
2. Are you NCQA accredited?
   Yes.

II. Administration

1. Please describe your administrative services?
   Our administrative services are awesome :-)
2. Is there an additional cost for administrative services
   No.
3. If there is a cost for administrative services, please summarize them here.
   Not applicable, there is no addtional cost for admin services.
4. What is your retention for overhead and profit?
   B.

III. Performance Guarantees

1. Please describe your performance guarantees.
   We guarantee everything 100%.

<u>Home</u> : <u>Wigets R Us</u> : Post RFP

Response Posted
Your response to the Wigets R Us RFP has been posted.

An e-mail notification has been sent to Jeff Spencer (jspencer@proposaltech.com) from Wigets R Us.

FIG. 23

Home : View RFP : Cola Bottlers

RFP Status: 5 of 17 Questions Answered (29%)

Print RFP

I. Qualifying Questions
 1. Are you cabable of administering the plan that has been specified in the RFP?
 2. Are you NCQA accredited?
 3. Is your organization admitted in California?
 4. Do you have administrative turnover greater than 30%?
 5. Do you have capital reserves greater than $15,000,000 for the exclusive use of paying claims?
 6. Are you willing to create a dedicated unit to support this organizations employee questions?

II. Administration
 1. Please describe your administrative services?
 2. Is there an additional cost for administrative services
 3. If there is a cost for administrative services, please summarize them here.
 4. What is your retention for overhead and profit?
 5. Is your organization year 2000 compliant?
 6. If your organization is Y2K compliant, what steps were taken to become compliant? If no, what steps are being taken to guarantee compliance and when do you expect to be compliant?

III. Finance
 1. Can you supply your annual financial statements for the past 3 years?
 2. The client prefers that commissions be excluded from the rate quote. Are you able to accomodate that?

IV. UM/QA
 1. Please describe your utilization management services.

V. Performance Guarantees
 1. Please describe your performance guarantees.

VI. Rates
 1. Please describe your rates on a three tier basis for HMO, POS and PPO.

FIG. 24

Home : Cola Bottlers : Answer Question

If there is a cost for administrative services, please summarize them here.

Response/Comments

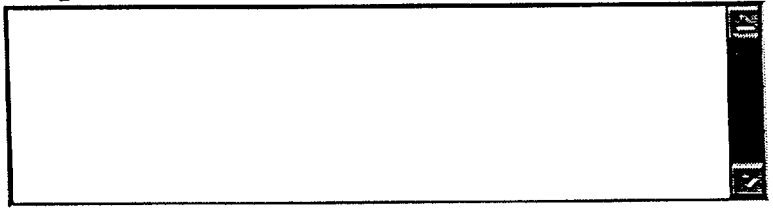

You have answered a related question in the past with the following responses. To re-use the answer, select from the list below and press "Post Response". NOTE: the selected response will replace any existing response you may have for this question.

- ○ see detail. Not applicable, there is no addtional cost for admin services.
- ○ see detail. Our charge is $150 per hour.
- ○ see detail. Our charge is $250 per hour.

[ Post Response ]

WEB BASED SYSTEM FOR MANAGING REQUEST FOR PROPOSAL AND RESPONSES

FIELD OF THE INVENTION

The present invention relates to a web-based computer system and method for preparing requests for proposals, responding to questions, and analyzing questionnaires used to identify vendors for products and services.

BACKGROUND OF THE INVENTION

Industries require goods and services that are specific to their particular line of business. These goods and services could be anything from machine parts to benefit services. While there may be no particular way to go about purchasing these goods or services, they are typically purchased by performing some degree of due diligence so that industries can justify their purchasing decisions.

In some cases, the due diligence may be as simple as sending a letter to a vendor describing the desired good or service and asking the vendor to respond to the letter with pricing information and a capabilities description. However, a typical method for the due diligence process is creating full-blown Requests For Proposals (RFPs) or Request For Quotations (RFQs). The process is typically one of significant labor and effort, requiring substantial time and monetary investment from the purchasers, as well as, from the potential vendors. Depending on the industry, the term RFP and RFQ is often used interchangeably. The distinction is industry specific and for the purpose of this invention, RFP is used for both. Moreover, the term user, RFP creator, and purchaser are used interchangeably; and the term vendor, respondent, proposal creator, and user are used interchangeably, throughout this application.

Goods and services that are purchased through this process need to be customized to the purchaser's specifications that are described in detail in a RFP. For many specialized goods and services, there is no retail market place that defines these specialized goods and services because these goods and services are not typically available or financially accessible to the general population. The budgets that support corporate purchasing decisions tend to be very large, often times in the millions of dollars. As a result, purchasers and their counterparts want to fully disclose their requirements to the potential vendors of goods and services. Likewise, the vendors require clear and well-defined requirements from their potential purchasers because, if they promise capabilities that they cannot deliver, they run the risk of losing the current and possibly future business. The detailed RFP or RFQ clearly defines the requirements from the vendor.

The current environment for RFPs is one where a purchaser identifies a need within the organization and creates a detailed RFP to present to the potential vendors of the desired product. The RFP is typically comprised of questions related to the potential vendor's capabilities, operations, financial history, service areas and more. The scope of the questions is not limited to these areas, however, these are typical areas of interest for purchasers of goods and services. The process of identifying, compiling and creating RFPs tends to be labor intensive. This process, which is relatively manual, requires a serious and tedious commitment to detail. RFP questions are created from a variety of sources from inside and outside of the purchaser's purchasing organization. When all questions and specifications are completed, the RFP is compiled and prepared using a word processing program.

Once the RFP is completed, the rules for responding to the RFP and the RFP itself are printed, bound and sent out to the potential vendors. This portion includes any necessary contact information or other pertinent information. Potential vendors are identified using a variety of methods. Typically, purchasers have relationships with many of the potential vendors. Additional vendors are identified by compiling contacts from industry contacts and colleagues.

Once an RFP is received by a vendor, the vendor goes through its own due diligence process. Vendors review the RFP to see whether or not the vendors are qualified and whether they want to respond. If a vendor decides to respond, the RFP is sent to its proposal unit under the direction of an account manager or some other form of management. The proposal unit reviews each of the RFP questions and finds appropriate responses in its response manual or has to research the capabilities of the company. This response is then entered into a word processor to respond to the question. Once all of the questions have been addressed, the response to the RFP is prepared and sent back to the purchaser.

The purchaser, upon receiving the completed RFP from the vendor, begins the manual process of analyzing the results of the RFP. By reviewing each response, the purchaser can establish which vendor best meets the organization's needs. This process requires that each question be reviewed manually to ensure the question has been answered completely. While the RFP responses are being manually reviewed, often, a manual scoring mechanism in a scorecard is used to track results and responses. Once all of the results have been reviewed, the scorecard typically indicates a winner. These results are ultimately used to make final purchasing decisions.

As an example, the employee benefits industry uses this process for generating RFPs and responding to RFPs. Typically, employee benefits providers are requested to provide a proposal and description of their products by consultants who deal directly with clients such as businesses that seek health coverage for their employees. The consultant generates a RFP to be mailed to several competing health insurance providers. The RFP includes a group of questions related to the providers' products, offerings, and policies. These RFPs or questionnaires generally include numerous complex questions that require different answers depending on the purchaser requirements, size, and type of business. Furthermore, RFPs need to be customized for different purchasers based on their own specific requirements and tailored to the types of vendors providing the requested goods and services. However, many of the questions in the RFPs may be common to a variety of purchasers.

Moreover, answers are usually short lived, and need to be generated by interacting with resources located at various locations within the provider's company. The time needed by the users to generate the RFP and for the vendors to respond to a given RFP in a quality manner has increased, while the deadlines established by the purchasers have been increasingly condensed.

Some attempts have been made to computerize some aspects of the process wherein questions and corresponding answers were stored in a database that could be accessed by responding vendors to respond to a RFP. Other systems have been described that are based on a word processing system and run in a heterogeneous environment. These semi-computerized systems lack the ease of use and portability. Users would have to acquire specialized and complex software to be able to use the system. It would be advantageous therefore to have a system that automates the entire process of creating, responding to, and analyzing a RFP in a common and homogeneous environment that is accessible by selected users without having to acquire specialized and complex software.

SUMMARY OF THE INVENTION

With respect to the processes described above, there is a need for a more efficient method of managing the entire RFP process that can automate and facilitate the creation of a RFP, response to the RFP, and analysis of the RFP in a common, secure environment accessible by selected users.

These and other needs can be met by an embodiment of the present invention. One embodiment of the present invention is a method and apparatus that enables users to create a common environment for all RFP users, both creators (consultants) and respondents (vendors), to facilitate the RFP process. An Internet based computer system assembles and organizes the information into a common format in a plurality of databases accessible through a web site interface by selected users. The system makes it easier to access, interpret and analyze all the pertinent data in a localized environment using a web site interface. The method and apparatus of the present invention greatly enhance efficiency and decrease cost.

In one embodiment of the present invention, the system and method provide RFP creators with the capability to capitalize on previously developed RFP's and specific questions within each RFP using a question database and a RFP database accessible through the web site interface. This capability is further enhanced by the ability to add new and unique questions. An automated response system enables RFP respondents to capitalize on their previously created responses to the same questions when they are re-used. The automated response system uses a response database that is linked to the question database and is accessible through the web site interface. Additionally, the RFP creators are provided with a scoring and weighting program to quickly estimate the value of each response to questions included in the RFP. This analysis program is used to create preliminary scorecards and final scorecards depending on the stage of evaluation.

An automated evaluation software module evaluates the completed vendor responses once completed RFP's have been received in their final completed form. The evaluation module evaluates responses for true and false, multiple choice, and text responses. Preferably, the text responses are summarized and evaluated only once by RFP creators who manually review new text responses, as opposed to every time they re-appear in an RFP. The system of the present invention also accurately tracks and references information from previous RFP's using an RFP database accessible through the web site interface.

The system also helps users track critical proposal guidelines, instructions, contacts, results and other key information. Accessing critical information such as questions, responses, scoring and summaries of responses in databases through a common interface, such as a web site interface, furnishes the users with a secure, easy to use, high quality, and timely process for generating, managing, and responding to RFPs.

Another embodiment of the present invention provides a method and apparatus that enables users to generate RFP forms from a variety of sources within a secure communications network such as the Internet. RFP sources include current and historical internal RFP databases, as well as questions and references from external resources. Multiple users can collaborate on a single RFP form or on a response to a RFP from within the same office or from locations around the world. Once completed and approved, the RFP form is posted to the communications network and is given a unique location on said network so that vendors may locate it. A criteria form enables the RFP creators to add response criteria and weighted values to each individual question as they create their RFPs. The criteria are only available for use by the RFP creator for the purpose of evaluation and analysis. The criteria are preferably not made available to the vendors (respondents). These response criteria are then evaluated against the response forms to create a preliminary scorecard. The RFP creators can add weights to each section and question. When the RFP response form is evaluated, a score can be automatically tallied by the system to give reviewers a preliminary list of the qualified vendors for a given project. After totaling the scores for all of the defined responses (typically yes/no or multiple choice questions), users can evaluate text responses using the scoring system. After reviewing the responses to individual text questions, a score can be given to each response and ultimately totaled for a final scorecard.

In an embodiment of the present invention, the system creates RFP response documents from historical relationships between questions, answers, and previously created RFPs in the system. Once RFP forms have been posted to the communications network, RFP respondents can review the RFP and begin to identify appropriate responses. Using an automated linking routine, respondents can utilize the previous responses to the same or similar RFP questions stored in the response database. This part of the system also allows for collaborative behavior, enabling users to share questions and responses with respondents from remote locations. Once completed, the system runs an automated routine to determine whether or not the RFP response is completed. Responding vendors post their response to the communications network and the system sends a notification of completion to the RFP creator entity via said communications network.

Another feature of the present invention facilitates the distribution of the newly created electronic RFP document. Upon completion of the RFP form, invitation notes to participate are sent automatically by the system to the specified users via a communications network. The invitation notes include, but are not limited to, vendor password, log in information, and the address of the RFP on the communications network. Other pertinent information such as due dates and any special instructions may also be included along with the invitation. Once the vendors complete the RFP response forms (proposals), the proposals are posted to the communications network for review by the RFP creators for review and analysis.

In one embodiment, the system enables users to produce results and summary materials directly from an analysis database. Moreover, users can track their progress on a multitude of projects using a project manager software tool. The RFP respondents may also be notified of their status on any given RFP. This is carried out by a progress tracker that monitors each response to make sure it is complete, a status tracking software tool which informs respondents of the status of their completed responses, and quality tracking software tool which provides feedback on reviewed RFPs once they have been scored. These software tools collectively make up the project manager software tool.

These and other features of the present invention will become readily apparent in view of the accompanying drawings and the detailed description of the embodiments.

BRIEF DESCRIPTION OF THE DRAWINGS

FIG. 2 is a simplified flow diagram of an overview of one embodiment of the present invention;

FIG. 3C is a simplified table summary of the relationships between questions and the respective responses and analysis.

FIG. 4 is a simplified flow diagram for creating an RFP;

FIG. 5 is a simplified flow diagram for responding to an RFP;

FIG. 6 is a simplified flow diagram for evaluating a completed response to a RFP;

FIG. 7 is a simplified flow diagram for maintaining a response database;

FIG. 8 is a simplified flow diagram for maintaining a question database;

FIG. 9 is a simplified flow diagram for archiving and using client data;

FIG. 12 is an example of actions (options) available to a RFP creator upon logging in to the system;

FIG. 13 is an exemplary form for creating a new RFP;

FIG. 14 is an exemplary form for adding a multiple choice question;

FIG. 15 is an exemplary form for editing questions;

FIG. 16 is an exemplary form for selecting the RFP recipients and sending them an invitation to response;

FIG. 17 is an exemplary form for an address book;

FIG. 18 is an exemplary form for editing contacts in an address book;

FIG. 19 is an exemplary form for creating a new proposal;

FIG. 20 is an exemplary form for viewing and selecting proposals that are available in the user's admin. area;

FIG. 21A is an exemplary form for a RFP;

FIG. 21B is an exemplary form for reviewing, responding, posting and printing a proposal;

FIG. 22 is an exemplary form for confirming that the proposal creator has posted a proposal for review;

FIG. 23 is an exemplary form that shows questions in a proposal and the percent of questions completed; and FIG. 24 is an exemplary form that shows the response history matched to a given question.

DETAILED DESCRIPTION

Figure 1:
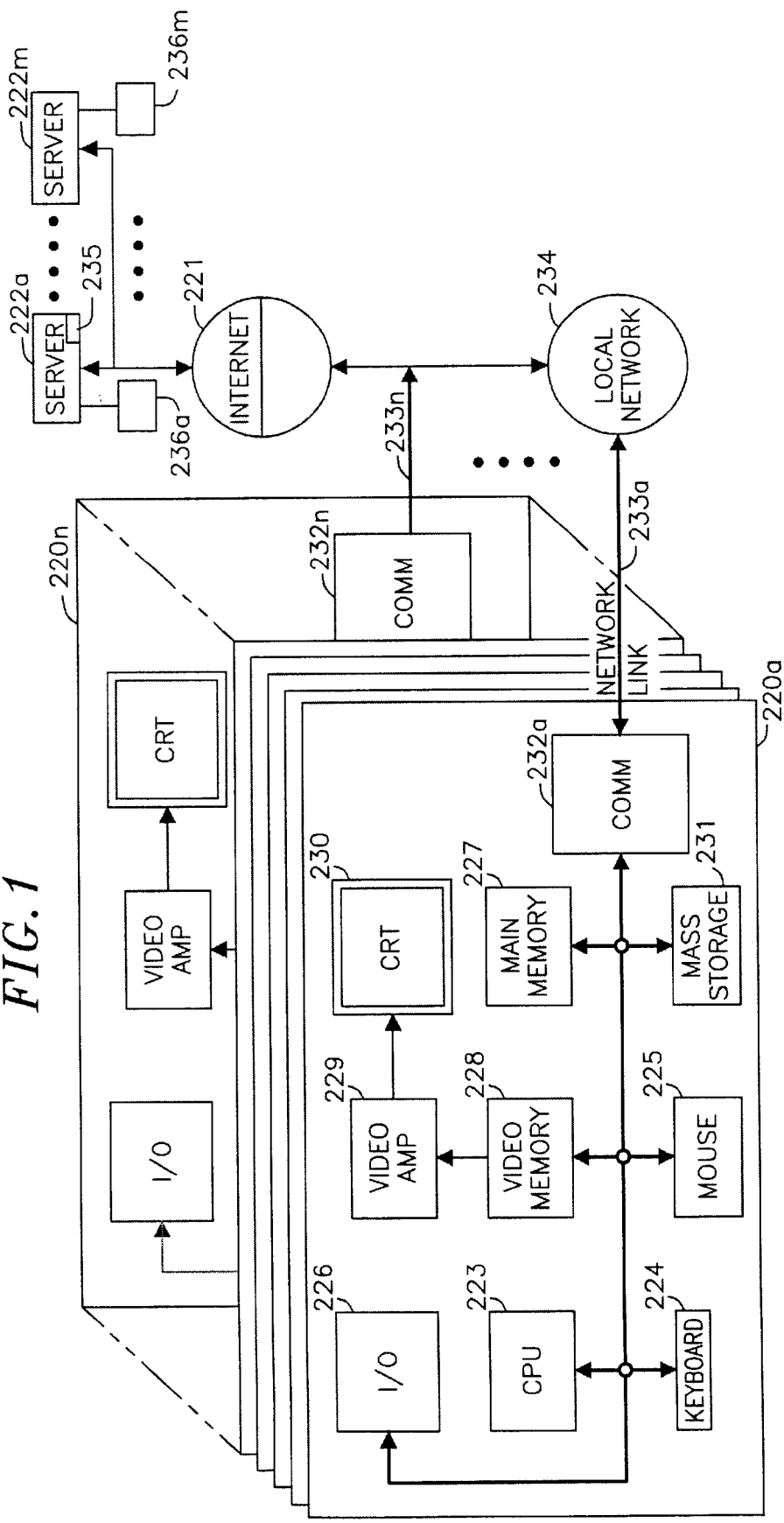
FIG. 1 is a simplified block diagram of a typical Internet environment.

The present invention makes the RFP process more cohesive from start to finish. The Internet-based computer system of the present invention facilitates consistency among all users, both purchasers and vendors, by creating a common environment in a communication network to guide users on both sides of the process. Accordingly, the results are more accurate, timely, and complete. The process of the present invention includes creating a RFP, responding to the created RFP, analyzing the responses to the RFP, presenting and reporting the results, and maintaining and updating databases. Additionally, the present invention includes computer programs for searching and templates for creating new RFPs that are specific to particular industries such as the employee benefits and manufacturing industries. The present invention also provides a computer program for checking the accuracy of the information contained in the databases including a spell check program, and a program for presenting the completed analysis.

Additional presentation materials and information such as drawings, graphics, tables or other electronic documents can be attached to the created RFP forms or to the proposals.

The Internet has recently been popularized by the rapid success of the World Wide Web (WWW or Web). The Web links together a variety of computers from around the world and various topics in a non-sequential web of associations which permit a user to browse from one topic to another, regardless of the format and order of topics. Users access and browse the Web using a web browser that generally resides and is executed on the user's computer. Commercially available web browsers such as Netscape's Navigator™ and Microsoft Internet Explorer™ are very common and accessible by personal computer (PC) users. The web browser allows a user to retrieve and render hyper-media content from the network of computers within the Web, including text, sound, video and other types of data. These hyper-media contents are stored on different web sites.

Web sites are locations on server computers that are accessible through Internet. A variety of information, such as hyper media contents and databases can be stored on a web site and be access by users with computers connected to the Internet. One of the applications of the Web is its capability to link a web site with a database so users can search for information. In essence, the web site becomes the user UI for database applications enabling a user to select search criteria and execute searches of a database that resides on a remote computer. To serve up pages, web sites need a server (a host computer) and server software that runs on the Server. The host computer manages the communication protocols and houses the pages and related software required to create a web site on the Internet. Host computers spread throughout the Internet can house different web sites.

The Internet works based on a client/server model. In this model, a client computer communicates with a server computer on which information resides and the client computer depends on the server to deliver requested information and services. These services may involve searching for information and sending it back to the client, such as when a database on the Web is queried. Other examples of these services are delivering web pages through a web site, and handling incoming and outgoing e-mail. Typically, the client is a PC user using a browser to connect to and search the servers. The servers (also known as hosts) are usually more powerful computers that house the data and databases. The client/server model enables the Web to be conceived of a limitless file storage medium and, distributed among thousands of host computers, all accessible by any individual PC user.

The web site and the hosts that make up the World Wide Web need to have unique locations so that a client computer can locate and retrieve information and web pages. For example, the unique identifier for a host computer is called IP (Internet Protocol) address and the unique identifier for a web site (web page) is called the URL (Uniform Resource Locator). A URL indicates where the host computer is located, the location of the web site on the host, and the name of the web page and the file type of each document among other information.

Home and small business users connect to the Internet through Internet service providers using modems and common telephone or cable networks. Although, wireless and satellite connections are also possible. Larger businesses typically obtain access to the Internet through their private computer networks, using appropriate safeguards to prevent unauthorized access by outside parties to a company's private network.

FIG. 1 shows a block diagram of a typical Internet client/server environment used by the RFP creators and RFP respondents in one embodiment of the present invention. PCs 220a–220n used by the RFP creators and RFP respondents are connected to the Internet 221 through the communication links 233a–233n. Optionally, a local network 234 may serve as the connection between some of the PCs 220a–220n, such as the PC 220a and the Internet 221. Servers 222a–222m are also connected to the Internet 221 through respective communication links. Servers 222a–222m include information and databases accessible by PCs 220a–220n. In one embodiment of the present invention, a question database, a response database, an analysis database, a client database, a user database, and a RFP database (shown in FIG. 3) reside on at least one of the servers 222a–222m and are accessible by the RFP creators and RFP respondents using one or more of the PCs 220a–220n.

In one embodiment of the present invention, each of the PCs 220a–220n typically includes a central processing unit (CPU) 223 for processing and managing data; and a keyboard 224 and a mouse 225 for inputting data. A main memory 227 such as a Random Access Memory (RAM), a video memory 228 for storing image data, and a mass storage device 231 such as a hard disk for storing data and programs are also included in a typical PC. Video data from the video memory 228 is displayed on the CRT 230 by the video amplifier 229 under the control of the CPU 223. A communication device 232, such as a modem, provides access to the Internet 221. Optionally, one or more of PCs 220a–220n may be connected to a local network 234. An Input/Output (I/O) device 226 reads data from various data sources and outputs data to various data destinations.

Servers (hosts) 222a–222m are also computers and typically have architecture similar to the architecture of PCs 220a–220n. Generally, servers differ from the PCs in that servers can handle multiple telecommunications connections at one time. Usually, servers have more storage and memory capabilities, and higher speed processors. Some server (host) systems may actually be several computers linked together, with each handling incoming web page requests. In one embodiment, each server 222a–222m has a storage medium 236a–236m, such as a hard disk, a CD drive, or a DVD for loading computer software. When a software such as the software responsible for executing the processes in FIGS. 2, 4, and 5 is loaded on the server 222a, an off-the-shelf web management software or load balancing software may distribute the different modules of the software to different servers 222a–222m. Therefore, in one embodiment, the computer program responsible for executing the present invention resides on one or more servers.

An exemplary web site location 235 is shown on server 222a in FIG. 1. The web site 235 is the UI for accessing the databases shown in FIG. 3. The web site 235 has a unique address that is used by the users to access server 222a (in this example) and the web site location on the server 222a. The computer software for executing the processes of the present invention may also reside on the web site 235.

FIG. 2 depicts a flow diagram of a computer program executed by one or more of the PCs 220a–220n for one embodiment of the present invention. The computer program generates, applies, and maintains RFPs in a web-based environment. A web site interface 1 (shown in FIG. 3) provides the user interface to a plurality of databases for the authorized users such as purchasers (RFP creators) and vendors (RFP respondents). In step 200, PC users access a web site residing on one of the servers 222a–222m to log into the system. Once a user is properly logged in and the user's password is verified, the user is provided with the web interface 1. Depending on the type of the user (i.e., a RFP creator or a RFP respondent), the user is given access to the appropriate databases residing on one or more of the servers 222a–222m. An RFP creator uses one of PCs 220a–220n to access a Question database residing on one of servers 222a–222m.

RFP questionnaires are compiled by using the Question database via the Internet 221 (in FIG. 1) where selections are made by the RFP creator to create a completed RFP as shown in step 201. To create the RFP, RFP creators may search the Question database using a database search program and select from a set of related questions from the Question database, from edited existing questions, from newly created questions, or from any combination of the three. The newly created and revised questions are then stored in the question database for future use. In the alternative, RFP creators, using one or more of PCs 220a–220n, can access a RFP database, residing in at least one of servers 222a–222m, through the web site interface 1 to search and select a previously created RFP. The selected RFP can then be modified and tailored to create a new RFP. An example of a created RFP is shown in FIG. 21A.

Once the RFP is created, it is posted in a location on the Web accessible through the web site interface 1. Posting a document in an Internet environment, stores the document in a location on the Web and makes it accessible to qualified users. Next, in step 202, the computer program helps the RFP creator to generate an electronic notification, such as an e-mail that includes an address to the location of the posted RFP on the Web (address of the server that the RFP is stored and the location of the RFP within the server) and a user password to access the posted RFP. The notification is then sent to selected respondents using the PCs 220a–220n connected to the Web through the communication links 220a–233n.

Upon receiving the notification, the selected respondents utilize the user password to access the posted RFP on the given location within the web site environment (the respective server). In step 203, the respondents utilize a response database that is linked to the question database to generate responses to the posted RFP. Each question in the question database is linked to one or more appropriate responses in the response database. Responses are identified for the RFP by reviewing these links between questions and responses. Once the computer program identifies these links, it suggests the identified responses to the respondent as potential responses. The age and appropriateness of the response is also evaluated when the system makes decisions for matching questions and responses.

The computer program ranks responses and orders them in the order of response that is most likely to satisfy the question in the RFP. The RFP respondent, using one or more of PCs 220a–220n, may select one or more responses for a given question, edit and modify the response, and use the response to compile a completed response to the entire RFP. Once the response to the posted RFP (proposal) is completed, it is posted on a location accessible through the web site interface 1 (stored in one of servers 222a–222m). An electronic notification, such as an e-mail is then sent to the RFP creator through the Internet 221 to indicate the completion of the proposal as shown in step 204. An example of a completed response to a RFP (proposal) is shown in FIG. 21B.

Once the response to the posted RFP is received, the RFP creator reviews and analyzes the response using a computer program as depicted in step 205. The RFP creator, using one or more of PCs 220a–220n, begins an initial review of the response (proposal) by using the automated features of the present invention. The RFP creator reviews responses to the yes/no, true/false, multiple choice, and selected text questions and responses, provided the text responses have been manually reviewed in previous RFPs. The system creates an initial score based on the evaluated responses. Next, the RFP creator reviews the remaining responses and scores them accordingly. The system includes the capability of outputting the analysis data and other information to off-the-shelf software such as Microsoft Exel™, Microsoft Word™, Microsoft Access™ and Microsoft Powerpoint™, among others, for further analysis, reports generation, and presentations.

In one embodiment of the present invention, the system includes the ability to perform, from within the system, online review, analysis, scoring and presentation generated by at least one of the servers 222a–222m. In step 205, the results of each proposal analysis are presented in user-customized reports. As shown in step 208, all the databases residing in one or more of the servers 222a–222m are maintained up-to-date to make available to the users all the information gathered and stored within the system, where appropriate. This allows the users to use the updated databases to prepare and respond to future RFPs. Additionally, the system has the ability to maintain contacts, RFP status, results of RFPs, and other information about RFPs and clients. At any step in the process, a RFP creator or a respondent may check the status of the RFP or the response respectively, as illustrated by step 207.

Figure 3A:
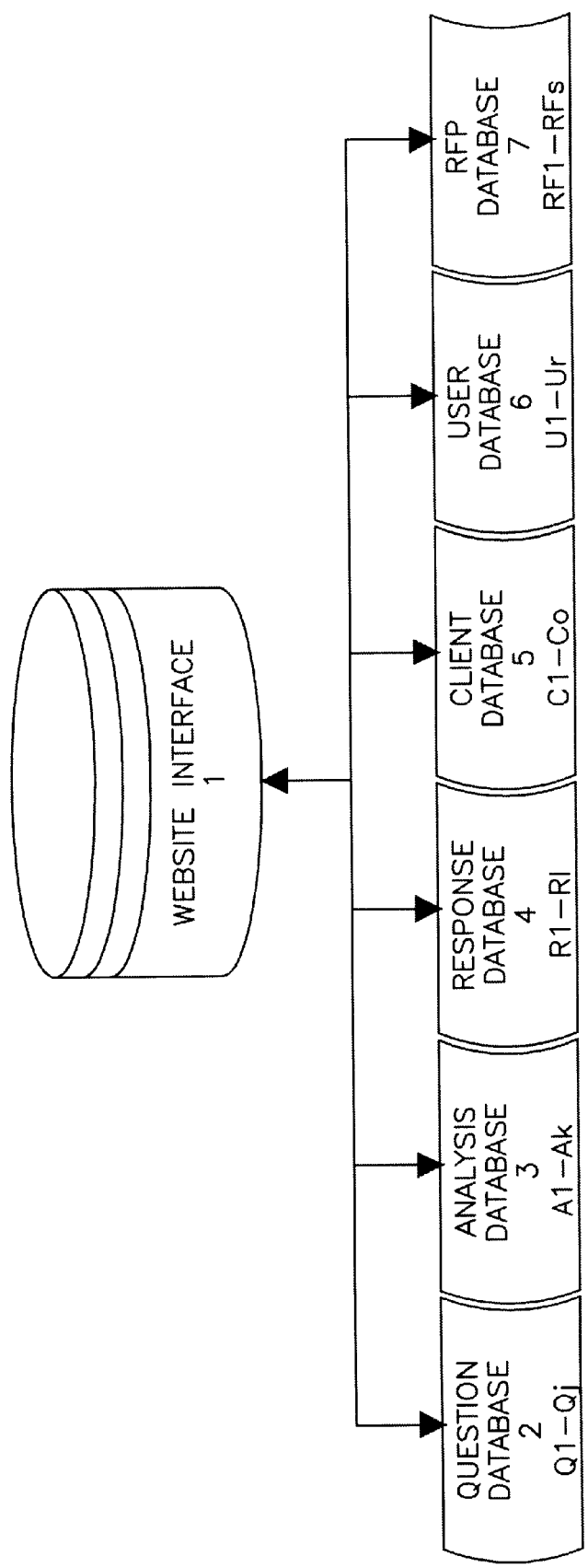
FIG. 3A is a simplified block diagram of a web site interface and associated databases.

FIG. 3 shows a web site interface 1 and the associated databases residing on one or more of servers 222a–222m. Web site interface 1 residing on one of servers 222a–222m is the user interface for the system and is also used for navigating through the databases. Each PC 220a–220n used by a RFP creator or a RFP respondent, accesses any of the servers 222a–222m through the web site interface. Depending on the user type (RFP creator or respondent), the web site interface is customized for questions and/or responses. Additionally, the web site interface 1 includes user specific customizations so that each user can efficiently use the system in a simple manner. Also, the system can be customized to match the look and feel of a user's existing Internet/Intranet.

Question database 2 stored on at least one of the servers 222a–222m is a database for current and historical questions accessed through the web site interface for developing questionnaires, linking to responses, and linking to historical response analysis. As questions Q1–Qj are created in the user environment, they are assigned unique system identifiers. These identifiers include question ID code, user ID code, RFP ID code and client ID code. This string of codes links the question to an appropriate response once a response has been produced. When a response to a question (identified via a concatenated code) is produced, the system records the question identification codes and stores them in the response database 4 along with the response and the response ID.

When a question is re-used, the matching response is identified by the system by searching the response database 4 for responses matching the question code. Questions that have been altered slightly or significantly from existing questions maintain a "parent"/"child" relationship. This means the original or "parent" question is used to create the updated or "child" question. If the parent question has responses in the database, the response also appears for the child and vice versa.

Analysis database 3 stored on at least one of the servers 222a–222m is a historical database, accessed through the web site interface 1, that contains the historical analysis and results of all previous RFP's. Any results and findings Al-Ak are captured and stored here. These analysis are made available to qualified users within the network. Analysis can be used to reflect comments on a particular question, response, user, vendor or client. Additionally, the analysis results can be re-used if the user chooses to do so. For example, the analysis would be re-used for the RFP simulator discussed below.

Response database 4 stored on at least one of the servers 222a–222m is a current and historical database, accessed through the website interface 1, for responding to RFP's through active links to questions asked in the posted proposal. Response database 4 includes responses R1–Rl that are linked to some of Q1–Qj in the Question database 2. When a historical response that matches an established criteria is identified by the computer program as being a match to a question in the posted RFP, that response is identified as a potential match and is presented to the RFP respondent as such. An exemplary screen for the presentation of the matched question(s) to the RFP respondent is shown in FIG. 24. There may be more than one response matching a given question. In such cases, the system provides the RFP respondent with a list of matched responses. The respondent can then select the most appropriate response from the list and add the selected response to the proposal. Preferably the list is ordered based on the degree of appropriateness of a response. For example, a response that has the most matched criteria is listed on top.

Client database 5, stored on at least one of the servers 222a–222m and accessed through the website interface 1, is a current and historical account of pertinent clients data C1–Co including contacts, passwords, proposal results, and outstanding proposals. User database 6, accessed through the website interface 1, is a current and historical account of pertinent user data U1–Ur, such as the identity of a user who creates a question, creates a response, summarizes a response, creates question criteria, comments on a particular question, or other activities associated with the process.

RFP database 7, stored on at least one of the servers 222a–222m and accessed through the website interface 1, is a current and historical account of all RFP data RF1–RFs, including type of RFP, creator of RFP, client of RFP, analysis results of RFP, and other pertinent RFP information. This database is accessed by the RFP creator to help the creator generate the RFP. An existing RFP may be selected from this database and if needed, can be edited to create a new RFP.

The above mentioned databases may be composed using off-the shelf databases that are compatible with an Internet environment. Examples of such databases are Microsoft ACCESSTM , DBASET™, SQL, and others.

FIG. 4 is a flow chart of a RFP creation process that is comprised of three major processes including creating the RFP from a template, creating RFP evaluation criteria, and posting the RFP to a unique web address. Log in step 10 identifies the user to the system. The system automatically directs users to their customized web site interface based upon the log in ID. RFP creators are directed to the creator and analysis section while respondents are directed to the response section. In an exemplary embodiment, the log in form uses cookies to remember a user ID and password. The cookies expire when users exit their web browsers. In step 11*a*, the RFP creator selects the desired action. Examples given are, the process of creating a new RFP, reviewing an RFP response, or maintaining the database. If create RFP is selected, in step 11*b*, the RFP creator decides whether to use an archives RFP or create a new RFP. FIG. 12 is an example of actions (options) available to a RFP creator upon logging in to the system.

Security and permissions are an important aspect of this invention. Users have access to only their own data and to the data that other users within their organization have given them permission to view and use. At no time will users from other organizations be able to view a competitor's information.

Referring back to FIG. 4, to create a RFP, the RFP creator may use an existing RFP stored in the RFP database 7 or create a new RFP as depicted in step 12. The RFP creator can also choose to review archived RFPs as shown by the "archived" path of step 12. As a result of this decision, the creator can select a saved RFP from the RFP database 7 (step 25). In step 21, the user may decide to create a new RFP by using client specific questions and by adding the client contact information including the type of RFP.

Figure 3B:
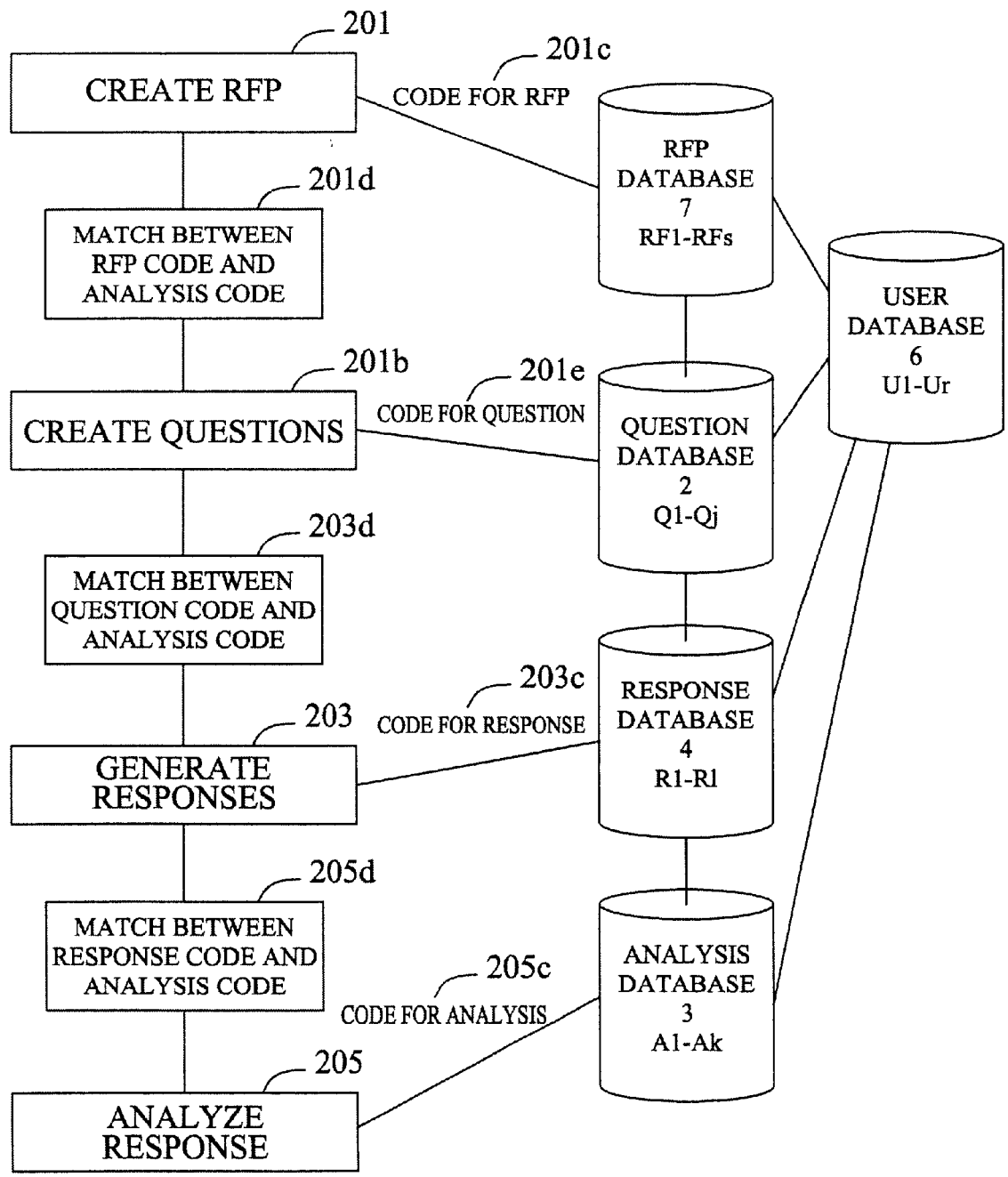
FIG. 3B is a simplified flow diagram for the linkage between the databases.

FIG. 3B schematically depicts the linkage between the databases. When an RFP is created in step 201, it is assigned a code 201*c* that identifies it to the system in the RFP database 7. As questions are created in step 201*b*, they are assigned a unique question code 201*e* and stored in the Question database 2. The question code 201*e* is then linked to the RFP database 7 to identify it as a part of the RFP. User information about who created the question and who used the question in subsequent RFPs is stored in the User database 6. When a response is provided to the given question in step 203, it is entered into the Response database 4. The Response database 4 also records the question ID 201*e* so that if the question ID re-appears in future RFPs its response is linked to the question and is made available for reuse. The same linking process holds true for multiple responses to the same question.

When analysis is done on the responses in step 205, the same process holds true. Responses are received and analyzed on the established scoring criteria for yes/no multiple choice defined answers. Preferable, the text responses are manually reviewed. Once the text response is reviewed, it is stored in the analysis database 3 with an analysis ID code 205*c* along with the response ID code 203*c*. When the response is reused, the response code 203*c* triggers a match in the analysis database 3 resulting in a matched analysis ID. The analysis stored in the Analysis database 3 corresponding to this analysis ID is then offered to the user as possible analysis for the RFP.

FIG. 3C shows an example of the links between the questions Q1–Qj, responses R1–Rl, and analysis A1–Ak. In this example, each question in table A has three major fields, a Question ID field, a Question field, and a Question Details field. The Question Details field may further include User, date, and other details. Each response in table B has four fields in this example, Response ID field, Response field, Question ID field, and Response Details field. The Response Details field may further include User, date, and other details. In this example, response R001 is linked to Q001 through its Question ID field as shown in table B. Responses R002, R003, and R004 all are linked to the same question, Q002, as shown in table B.

Similarly, each analysis in table C has four fields, Analysis ID field, Analysis field, Response ID field, and Analysis Details field. The Analysis Details field may further include User, date, and other details. In this example, analysis A001 is linked to response R001 and analysis A002 is linked to R002 through their Response ID fields respectively.

Figure 3D:
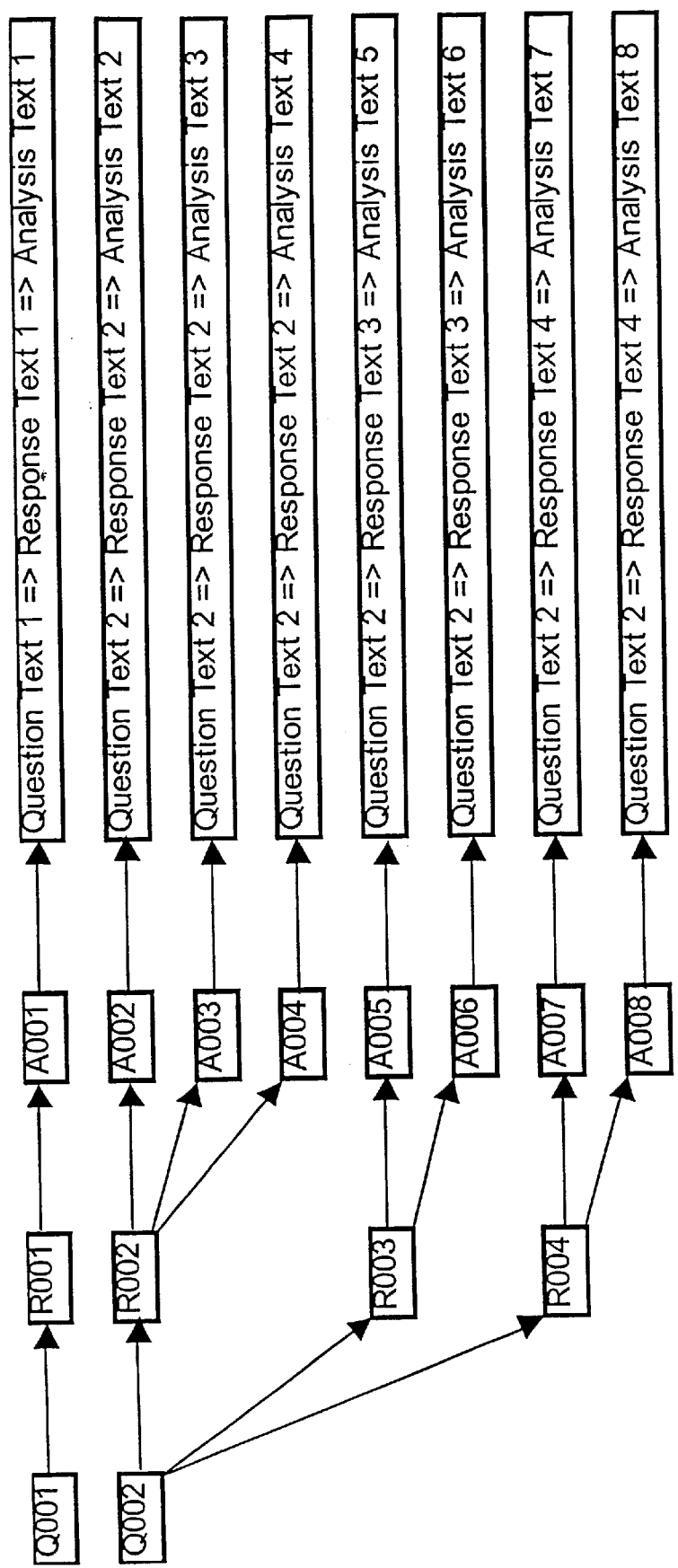
FIG. 3D is a simplified shematic summary of the relationships between questions and the respective responses and analysis.

FIG. 3D shows a schematic summary of the relationships between Q001 and Q002 and the respective responses and analysis. As discussed above, Q001 is linked to R001, which is linked to A001. Q002 is linked to R002 which is linked to A002, A003, and A004. Q002 is also linked to R003 which is linked to A005 and A006. Additionally, Q002 is linked to R004 which is linked to A007 and A008. In this manner, a search for responses corresponding to Q002 yields three possible response candidates, namely, R002, R003, and R004.

Referring back to FIG. 4, RFP questions can be organized into different sections. For example, questions can be organized under "qualifying questions," "administration," and/or "finance" sections. As shown in step 22, using the question database 2, the user can add previously created sections and questions. Also, the user can add new questions or sections. Using templates for predetermined RFP types (step 23), RFP creators can quickly choose a template that enables them to begin creating a client specific RFP. After the template or an existing RFP is selected, the user may review the RFP to add or delete appropriate sections or questions, as shown in step 24.

FIG. 13 shows an exemplary form for creating a new RFP. In this exemplary form, a "New RFP Type" is selected for the "RFP Type" box. Relevant information about the new RFP, such as the name of the company, any special instructions and disclosures are entered, and the "Create New RFP" box is selected. Selecting the "Create" button in FIG. 13 brings up an interim administration form that allows a user to take the first steps of adding questions as shown in the exemplary form of FIG. 19.

FIG. 14 illustrates an exemplary form for adding a multiple choice question. A question category such as "qualifying" or "rates" may be selected from a menu, or a new category can be defined. The new category for the questions is included in the menu the next time the menu is used. The question is then typed or pasted into the "question" box of FIG. 13 and the multiple answer choices are entered in the appropriate boxes. One or more criterion may be specified in the "question criteria" box. An exemplary form to create or edit a yes/no question is presented in FIG. 15. The question can be edited or deleted using the form of FIG. 15. To edit a question, the text of the question as shown in the "Question" box of FIG. 15 is modified and the "Edit Question" button is selected. To delete a question, the "Delete Question" button is selected. The criterion for the question can also be modified using this form.

In one embodiment of the present invention, each question is accompanied by one or more criteria that is used to develop a scoring summary for evaluating responses. For example, multiple choice questions may have a sliding value depending on the answer selected. If the question is worth, for example, five points, then the desired answer warrants full credit for the question, however, other (partial) answers warrant partial credit. This method is used for multiple choice questions. Tue/false and yes/no questions are all-or-nothing, that is, either the full credit is given or no credit is given for the question. The scoring for text questions is subjective and requires manual user intervention for assigning points to the respective responses.

Additionally, each question/section is given a weight that is used to develop a scorecard. The scorecard enables the RFP creator to review and value individual question responses. The scorecard is a user defined form designed to aid in the identification of qualified vendors. The points for the weighted questions and sections are summed to produce the scorecard document that identifies the most qualified vendors.

Referring back to FIG. 4, in steps 26 and 27, the question criterion and the question weight are added or edited. RFP creators may organize questions and sections within the RFP, for example, using navigation bars to re-order questions and sections, as depicted in step 28. Also, simple or complex instructions and attachments can be added to a created RFP as shown in step 29. This includes attached files in various formats including word processing and spreadsheet formats. If the RFP is ready, the completed and formatted RFP including related criteria is stored in the RFP database 7 for future reference as shown in step 31. If the RFP does not meet the client specific requirements, it goes back to the update RFP process in step 26. The system, in step 32, posts the RFP to a web site location accessible by selected users. In one embodiment, the created RFP is stored in a location on the host server.

One or more secure servers, requiring password, with data encryption capabilities to protect the confidentiality of the data is used to store all the data. In step 33, a list of recipients for the created RFP is compiled. E-mail, phone number, address and other pertinent information are entered in this step. An existing list stored in an address book may also be utilized to select the RFP recipients, as shown in FIG. 16. In step 34, the RFP recipients are selected preferably in the same screen.

FIG. 16 depicts an exemplary screen for selecting the RFP recipients and sending them an invitation to response to the posted RFP. A list of potential RFP recipients is displayed on this screen. Each name may be individually selected (or de-selected) by placing a check next to the name to be selected. This list may be ordered and displayed accordingly based on the type of the posted RFP, the RFP creator or the company that is seeking to purchase the goods and services from the RFP respondents through the RFP creator. A message with instructions is entered in the message box. The instruction include the address of the posted RFP within the web site environment, and a password for the respondents to be able to access the posted RFP.

Preferably, the web site location and the password are automatically entered by the system. In one embodiment, the password is specific to each RFP recipient. In another embodiment, the password is specific to the RFP creator and is the same for all the RFP recipients for a given RFP. New contacts can be added by selecting "address book," underlined in the exemplary screen of FIG. 16.

In an exemplary embodiment, if the user (RFP creator) selects the "address book," the screen of FIG. 17 appears that is used to add, edit, or delete contacts. A list of existing contacts is displayed within the screen of FIG. 17. Each contact name can be selected for editing or deleting the selected name. The order of the list may be customized by the user. If a contact name is selected, the screen of FIG. 18 is shown that is used to edit or delete the selected contact name. A new contact may be added by selecting "To add a contact go here" area of the screen shown in FIG. 17. If this feature is selected, the screen of FIG. 18 is provided to the user for adding new contacts.

FIG. 18 represents an exemplary screen for editing or deleting contacts from the contact list. This screen already has the information related to the selected contact filled in the appropriate boxes. Name, company, e-mail address, and user password for the selected contact may be edited using this screen. Alternatively, the selected contact may be deleted by selecting the "Delete Contact" area of the screen.

Referring back to FIG. 4, once the RFP is ready and the appropriate RFP recipients are selected, invitations are e-mailed to the selected recipients. FIG. 16 shows an exemplary screen for sending RFP invitations via e-mail. This e-mail includes the RFP web site location, for example the Uniform Resource Locator (URL) address for the computer that hosts the web site. The e-mail also includes a password to access the site upon logging in, and any instruction or additional contact information as part of the message body or as part of a file attachment.

When the RFP is posted and the selected recipients are notified, RFP recipients access the posted RFP using the address and the password(s) included with the notification messages. The RFP recipients (potential respondents) are then able to go to their personalized proposal administration page (shown in FIG. 20) to view all proposals to which they have received invitations. This proposal administration area further enables respondents to examine the RFP and if they decide to respond, they initiate the response process, as shown in FIG. 21B. RFP respondents/vendors can utilize the previous responses to the same or similar RFP questions stored in the response database. As shown in FIG. 21A, RFP is organized by different sections. The status of the RFP is noted at the top of the form.

FIG. 5 shows a flow diagram for responding to a posted RFP (shown by step 203 of FIG. 2). Once selected respondents have received the e-mail invitation via the Internet 221 and logged into the system using one or more of PCs 220a–220n, they may link directly to and review the posted RFP as indicated in step 40. In step 41, based upon previous responses to the same or similar questions stored in the response database 7, respondents can use an Auto-fill feature to respond to questions. Upon selecting this feature, the system searches the response database 4 to match the questions within the posted RFP to one or more responses stored in the response database 4. As indicated above, the responses are linked to questions using unique codes included with questions in the RFP as shown in FIG. 24.

At this point, preferably there are three outcomes, no response matches the question, one response matches the question, or multiple responses match the question. When there are multiple matched responses to a question, in step 43, respondents are able to choose the response that best fits the question. In an exemplary embodiment, the system prompts the respondent with a list of matched questions, preferably ordered by the degree of highest matched criteria. The respondent can select the most appropriate response and add the selected response to the proposal. If no response in the response database 4 matches the question, respondents may edit an existing response or enter an entirely new response. Either type of response is stored in the response database for future use.

Once a selection has been made from the multiple available responses to a single question, or if there is only one matching response to a question, the respondent decides if the response answers the question. If it does, the response is compiled for a completed proposal in step 51. If the matched response does not answer the question, it passes to the partial match step 45, and the response is edited in step 49 to provide an appropriate answer to the question. If the partial match is not adequate, a new response is created in step 46. In either case, the edited response is stored in the response database 7.

When there is no matched response, or when existing responses are not adequate, respondents are provided the capability to create new responses, as shown in step 46, and store them in the response database 4. In step 47, "Assign/Email Question to Team Member" feature allows a RFP respondent to send question to other team members or other experts to answer any given question. This provides an integrated and shared environment for different users (members of a team) to work on the same proposal. The responses from other team members are received and placed directly into the RFP in step 48. If there are matched responses in step 41, but they do not meet all the question specifications, the responses are updated to meet the criteria in step 49. In the alternative, existing responses can be edited to answer the question.

In step 50, the user manually checks responses for accuracy and completeness and any final changes are made here. The proposal also contains a status field to identify to users how many questions remain and what percentage of the total questions remain to be answered as shown in FIG. 23. All completed responses are compiled into a proposal document form in step 51. Responses within a proposal document can be organized into any format or order deemed suitable in step 52. Team members may review a final proposal document before it is approved for distribution as indicated by step 53.

If the proposal document has been through all of the response steps and it meets the requirements specified by the RFP, it is forwarded for posting on a location on the web in step 54. If the RFP is not ready it cycles back through the preparation process until it is completed as shown by the "No" path from step 54 to step 40. The system then, in step 55, automatically sends an e-mail to the RFP creator indicating that the response to the RFP is completed and has been posted to a web site. In step 56, the completed response is posted to an appropriate web location simultaneously with the e-mail notice of completion. The system notifies the RFP respondent that the proposal has been posted as shown in FIG. 22. In step 57, the completed response is automatically stored in response database 4.

When the e-mail notice of completion is received by the RFP creator, the RFP creator or the creator's delegates may review the proposal using the automated features of the system that utilizes the criterion and weight associated with each response within the proposal. The analysis may begin once a response deadline has passed or when all of the completion e-mails have been received. In step 60, the system checks all RFPs to verify that all completed responses have been submitted. A response wizard validates all question responses and compares them to an established scoring criteria. The response wizard, based on the weights of the questions and weights of the RFP sections, creates a report in step 69 giving preliminary results for all questions that can be evaluated by the system. This report details the initial findings based upon the established criteria which can be evaluate by the system. The report includes yes/no questions, multiple choice and text questions that can be evaluated by the system without manual intervention.

Based upon the results of the report, the RFP creator can determine which vendors meet the basic criteria to continue with the evaluation process. If a vendor meets the minimum criteria set by the user, they are considered a finalist as shown in step 62. If a vendor does not meet the criteria, the rest of the analysis is terminated and the vendor is no longer considered for the proposal (step 63). In step 70, the rejected vendors are issued a notice, preferably, by e-mail that they are no longer in contention for the work. This notice is also posted to a status report page.

The remaining subjective responses are reviewed in step 64. These subjective responses can be truncated for reporting and analysis purposes. The original response remains intact in the response database. There is a link between the text responses and analysis of those responses that are stored in the analysis database. The truncated response can be used for future analysis and RFPs. For example, when the same text response to a question is received by the RFP creator, the received response can be checked against its previous analysis. The same scoring criteria as the previous criteria for the previous response may be used by the RFP creator for the received response. Because questions may be used over and over, these responses or summaries of the responses can be re-used. In step 71, using question and response links (unique codes to identify relationships from responses to summary of responses), the summarized responses are automatically shown in the scoring system. Any responses not covered by the response wizard are evaluated manually and summarized. Once summarized, the summaries will be available for future analyses.

In step 65, a scoring process is performed for RFP creators for storing, updating and maintaining results from step 64. Responses are compared to the existing criteria for each question. Scorecard results are created in step 66 for the remaining responses. The scorecards summarize all of the findings from the response wizard in step 61 and step 65. The scorecards are used to identify the vendors which best meet the users' needs. This information is then stored in the analysis database 3. The final summary reports/scorecards are generated in steps 67 and 68. This allows users to prepare reports at any time during the process. Any additional information that may be needed is generated. This allows users to output all of the data into the format of their choice or use the internal system tools to generate reports/results. Based upon all findings, a winner is chosen in step 73 and the results are stored in the analysis database 3, in step 74.

FIG. 7 shows a flow diagram for maintaining a response database. In step 14, a decision is made as to the type of maintenance, i.e., retire, edit, or create. If it is decided to retire a response, the response to be retired is selected in step 80. As shown in step 81, the selected response is then taken out of the actively used responses in the response database but may be kept as a retired response. A retired response may be re-activated from a retired status. The response database is then updated in step 82 to reflect the change. To edit an existing response, the response is selected in step 83. The response and criteria are then updated in step 84 to meet current needs. The database is updated in step 85 to reflect the new response and link to the appropriate question. The original question is left unchanged. The information for the response is entered and the created response is linked to the appropriate question or questions in step 86. When the response has been created and linked, criteria and keywords for the response are then created in step 87 and the response database is updated in step 88.

FIG. 8 shows a flow diagram for maintaining a question database. In step 16 a decision is made as to the type of maintenance, i.e., retire, edit, or create. If it is decided to retire a question, the question to be retired is selected in step 100. As shown in step 101, the selected question is then taken out of the actively used questions in the question database 2 but may be kept as a retired question. A retired question may be re-activated from a retired status. The question database is then updated in step 102 to reflect the change. To edit an existing question, the question is selected in step 103. The question and criteria are then updated in step 104 to meet current needs. The question database 2 is updated in step 105 to reflect the new edited question and link it to the respective parent question. The original (parent) question is left unchanged. The information for a new question is entered and the newly created question is linked to the appropriate question or questions in step 106. When the question is created and linked, criteria and keywords for the question are then created in step 107 and the question database is updated in step 108.

Data related to each client is stored in the client database 5. This data may be used to facilitate the creation of an RFP for the same or a different client. FIG. 9 shows a flow diagram for archiving and using client data. A search for client or RFP type is performed by the user in step 120. The user may search for client specific work, RFP type, or any other searchable parameter related to the client work. In step 121, a decision is made as to how the results will be used. Results can be either reviewed online, extracted for external analysis or used in a RFP simulator described below. The results are reviewed in step 122 and outputted in step 123.

Figure 10:
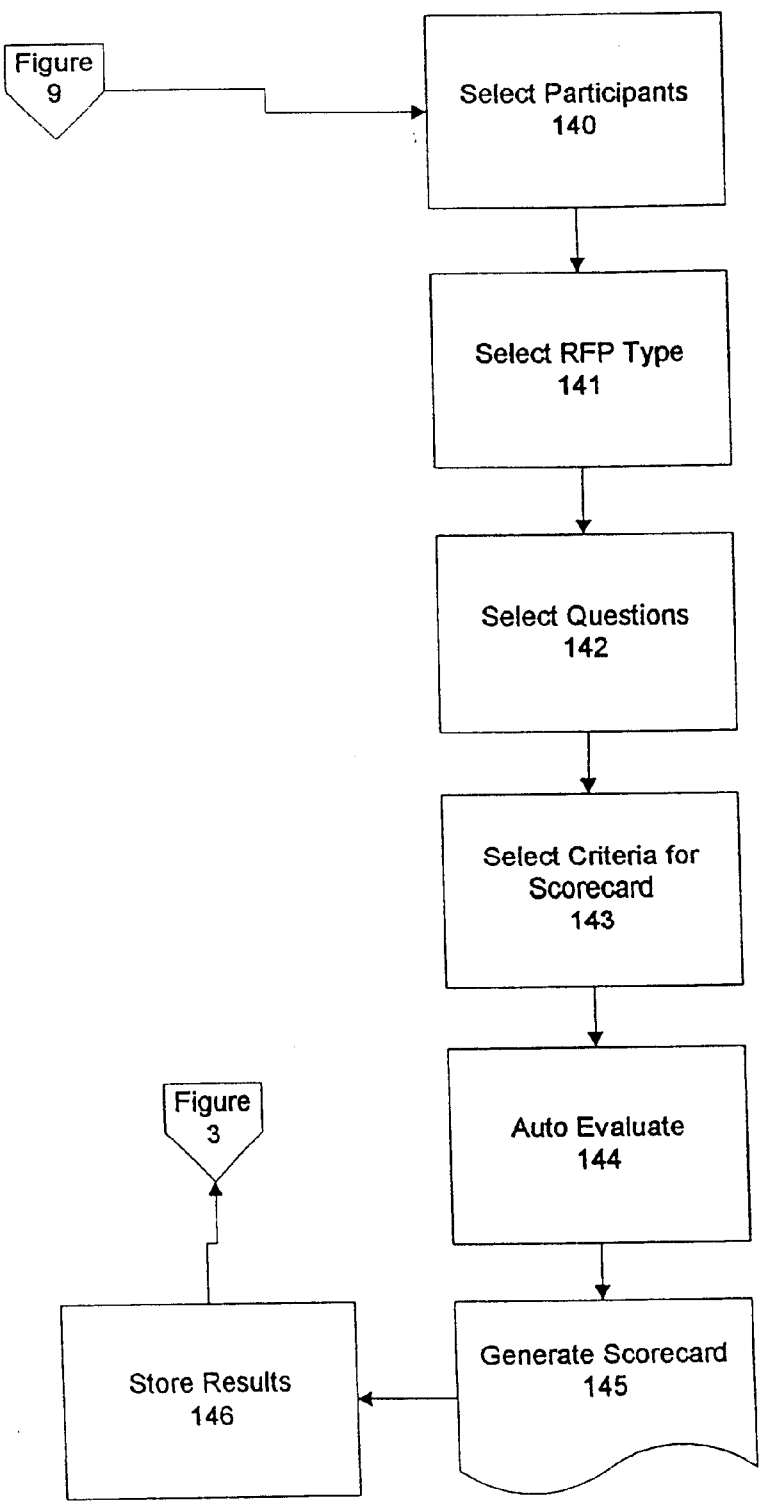
FIG. 10 is a simplified flow diagram for a RFP simulator.

A proposal simulator allows the users to evaluate historical responses to a RFP. The proposal simulator is useful for developing new "mock" RFPs and "mock" proposals by the RFP creator based on the existing information that the RFP creator has access to. The simulator produces a quick review of selected vendors and selected questions. For the simulator to be functional, the selected questions must contain responses that had been collected and evaluated in previous proposals. FIG. 10 illustrates a flow diagram for a RFP simulator. In step 140, previous RFP participants are selected from the RFP database 7. The type of RFP to model (for example, medical, dental, etc.) is selected in step 141. Next, questions from the database that each vendor has in common are selected in step 142 in order to create the model RFP. Then, criteria and scoring for the model RFP are entered in step 143 and the results are evaluated in step 144. The results are then summarized in a scorecard for presentation or analysis as shown in step 145. In step 146, the results are stored for future use and reference.

Figure 11:
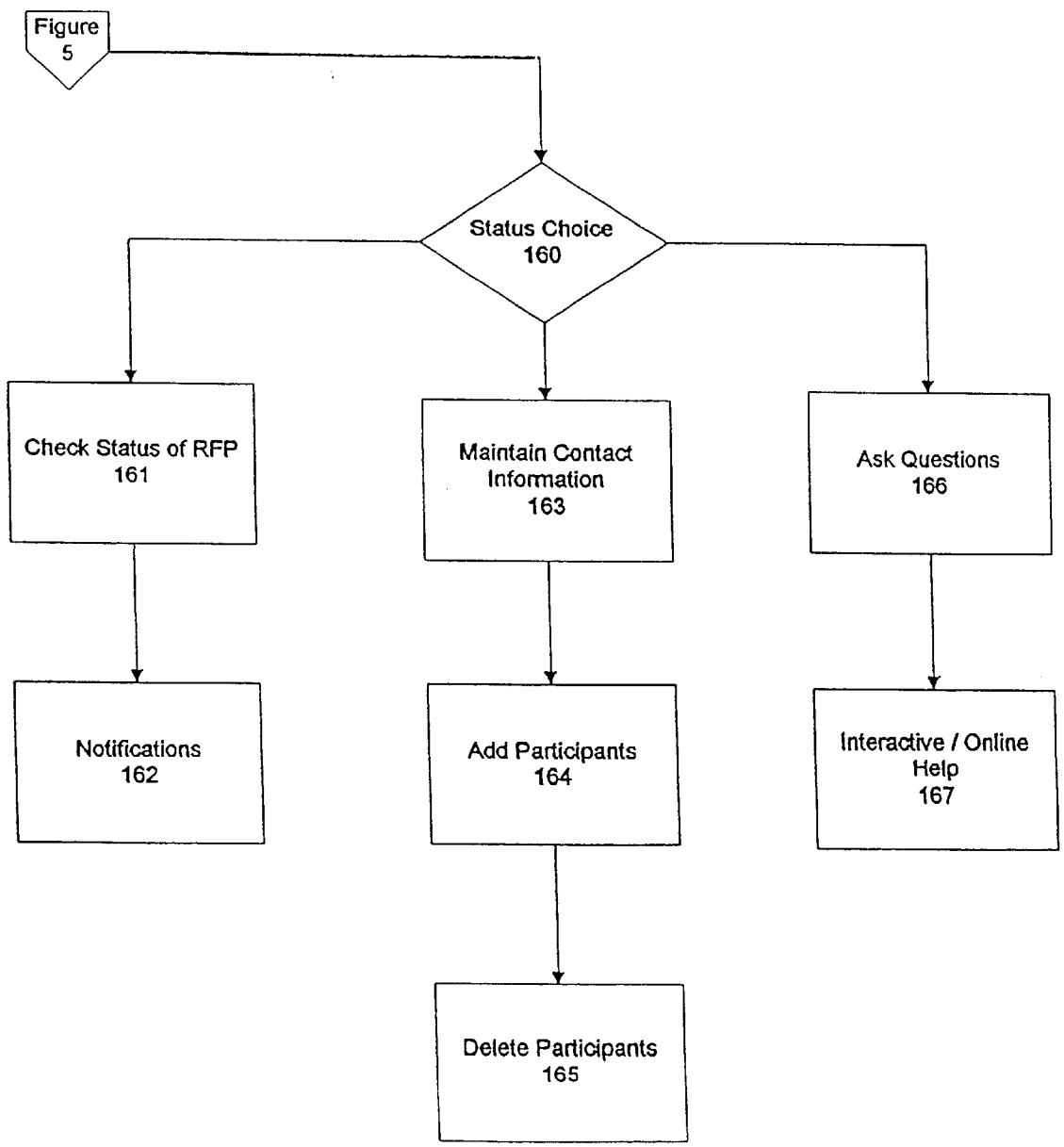
FIG. 11 is a simplified flow diagram for generating status reports.

At any time during the process, a status report may be generated based on a user request. The purpose is for any user to check the status of any related RFP. FIG. 11 shows a flow diagram for generating status reports. In step 160, the desired process is chosen by the user. The status of existing and historical RFPs may be checked in step 161 and notices from respondents may be reviewed in step 162. Contact information is maintained in step 163. This includes granting access to team members or updating contacts information. Participants in the RFP may be added in step 164, or deleted as shown in step 165. In step 166, vendors may ask questions of the RFP creators, for example, using a bulletin board accessible on the web. The bulletin board set up allows vendors to ask question and receive responses from the RFP creators. This bulletin board set up also allows vendors to find questions and answers asked by them and other RFP participants. An interactive online help is also provided by the system, as indicated by step 167, to help the users effectively use the system.

Althouh particular embodiments of the invention have been described in detail, it should be appreciated that numerous modifications, variations, and adaptations may be made without departing from the scope of the invention as defined in the claims.

What is claimed is:

1. A web based computer system for managing creation of a request for proposal (RFP) and responding to the RFP comprising:
   a web site accessible by qualified users;
   a question database accessible through the web site for storing a plurality of RFP questions;
   a first computer linked to the web and used by an RFP creator to create the RFP;
   means for selecting questions from the question database for use in the RFP;
   means for creating the RFP from the selected questions from the question database;
   means for storing the created RFP in a first location on the web site accessible by a selected RFP respondent;
   means for electronically notifying the selected RFP respondent;
   a response database linked to the question database and accessible through the web site for storing a plurality of responses;
   means for searching the response database for matching and selecting responses to the questions in the created RFP to generate a proposal in response to the RFP;
   a second computer linked to the web and used by the selected RFP respondent to create the proposal including selected responses from the response database;
   means for storing the generated proposal in a second location on the web site accessible by the RFP creator;
   means for electronically notifying the RFP creator; and
   means for storing the created RFP in a RFP database.

2. The computer system of claim 1 further comprising means for evaluating the generated proposal based on a predetermined scoring criterion for each response.

3. The computer system of claim 2 further comprising an analysis database for storing evaluations of previously generated proposals wherein, there is a link between a response and the analysis for the response.

4. The computer system of claim 1 further comprising a user database storing user data including information about users responsible for creating a question, creating question criteria, and creating a response.

5. The computer system of claim 1 further comprising a client database storing information including client contact and RFP information.

6. The computer system of claim 1 wherein each question in the question database is linked to one or more responses in the response database.

7. The computer system of claim 1 wherein means for electronically notifying the selected RFP respondents comprises means for identifying the selected respondents from a respondent list including names and e-mail addresses; and means for sending a message to the identified respondents, the message including a location for the stored RFP and a password for accessing the stored RFP.

8. The computer system of claim 7 further comprising means for updating the respondent list.

9. The computer system of claim 1 wherein means for searching the response database comprises means for identifying one or more matched responses, means for selecting one of the identified matched responses; and means for including the selected response in the proposal.

10. A method for generating a request for proposal (RFP) and responding to the RFP through a web site interface accessible by qualified users, the method comprising:
   accessing a question database through the web site for creating the RFP by a RFP creator;
   selecting questions from the question database;
   creating the RFP responsive to the selected questions from the question database;
   selecting one or more qualified RFP respondents from a list of RFP respondents;
   storing the created RFP in a first location on the web site accessible by the selected RFP respondents;
   electronically notifying the selected PFP respondents;
   searching a response database linked to the question database for matching and selecting responses to the questions in the created RFP to generate a proposal in response to the RFP;
   generating the proposal including selected responses from the response database;
   storing the generated proposal in a second location on the web site accessible by the RFP creator;
   electronically notifying the RFP creator; and
   storing the created RFP in a RFP database for future use.

11. The method of claim 10 further comprising evaluating the stored proposal based on a predetermined scoring criterion for each response.

12. The method of claim 11 further comprising storing evaluation results in an analysis database.

13. The method of claim 10 further comprising storing in a user database information including information about users responsible for creating a question, creating question criteria, and creating a response wherein, there is a link between a response and the analysis for the response.

14. The method of claim 10 wherein the step of electronically notifying the selected RFP respondents comprises identifying the selected respondents from a respondent list including names and e-mail addresses; and sending a message to the identified respondents, the message including a location for the stored RFP and a password for accessing the stored RFP.

15. The method of claim 14 further comprising maintaining and updating the respondent list.

16. The method of claim 10 further comprising generating a status report for the RFP and the proposal.

17. The method of claim 10 further comprising searching the RFP database, selecting a RFP, and including the selected RFP in the proposal.

18. The method of claim 17 further comprising editing the appropriate RFP.

19. The method of claim 10 further comprising maintaining the question database, the response database, and the RFP database.

20. The method of claim 10 further comprising creating responses, adding the created responses to the proposal, and organizing the proposal.

21. The method of claim 10 further comprising editing and organizing the selected response.

22. The method of claim 10 further comprising generating a mock RFP and generating a mock proposal by the RFP creator based on existing questions and responses.

23. A method for generating a request for quotation (RFQ) and responding to the RFQ through a web site interface accessible by qualified users, the method comprising:
   accessing a question database through the web site for creating the RFQ by a purchaser;
   selecting questions from the question database;
   creating the RFQ responsive to the selected questions from the question database;
   selecting one or more qualified vendors from a list of vendors;
   storing the created RFQ in a first location on the web site accessible by the selected vendors;
   electronically notifying the selected vendors;
   searching a response database linked to the question database for matching and selecting responses to the questions in the created RFQ to generate a quotation in response to the RFQ;
   generating the quotation including selected responses from the response database;
   storing the generated quotation in a second location on the web site accessible by the purchaser;
   electronically notifying the purchaser; and
   storing the created RFQ in a RFQ database for future use.

24. The method of claim 23 further comprising evaluating the stored quotation based on a predetermined scoring criterion for each response.

25. The method of claim 24 further comprising storing evaluation results in an analysis database.

26. A programming system for operation of a computer system, the computer system having, connected together for access over the web, a plurality of computers for creators of requests for proposals (RFPs), a plurality of computers for respondents of RFPs and a plurality of servers for storing information, the programming system being arranged for creation of a RFP and responding to the RFP comprising:
   a question database stored in at least one of said plurality of servers for storing a plurality of RFP questions accessible over the web;
   a first searching program for enabling the computer system to search said question database;
   a selecting program for enabling the computer system to select one or more questions from said plurality of RFP questions to create the RFP accessible over the web;
   a document creation program for enabling the computer system to create the RFP responsive to the selected one or more questions;
   a first web posting program for enabling the computer system to store, for access over the web, created RFPs created by said computers for RFP creators;
   a first notification program for enabling the computer system to notify selected said computers for respondents of said created RFPs;
   a response database linked to said question database and stored in at least one of said plurality of servers, including a plurality of possible responses to the RFP questions;
   a second searching and matching program enabling the computer system to search said response database and selectively match up selected ones of said plurality of possible responses to said created RFPs that have been stored to thereby create proposals accessible over the web;
   a second web posting program for enabling the computer system to store, for access over the web, created proposals created by said computers for RFP respondents; and a second notification program for enabling the computer system to notify selected said computers for creators of said created RFPs.

27. A computer readable medium having stored thereon a set of instructions including instruction for generating a request for proposal (RFP) and responding to the RFP through a web site interface the instructions, when executed by a plurality of computers connected to the Internet, cause the computers to perform the steps of:

accessing a question database through the web site for creating the RFP by a RFP creator;

selecting questions from the question database;

creating the RFP responsive to the selected questions from the question database;

selecting one or more qualified RFP respondents from a list of RFP respondents;

storing the created RFP in a first location on the web site accessible by the selected RFP respondents;

electronically notifying the selected RFP respondents;

searching a response database linked to the question database for matching and selecting responses to the questions in the created RFP to generate a proposal in response to the RFP;

generating the proposal including selected responses from the response database;

storing the generated proposal in a second location on the web site accessible by the RFP creator;

electronically notifying the RFP creator; and storing the created RFP in a RFP database for future use.

\* \* \* \* \*